(12) United States Patent
Kumacheva

(10) Patent No.: US 8,088,839 B2
(45) Date of Patent: Jan. 3, 2012

(54) METHOD OF PRODUCING HYBRID POLYMER-INORGANIC MATERIALS

(76) Inventor: Eugenia Kumacheva, Toronto (CA)

( * ) Notice: Subject to any disclaimer, the term of this patent is extended or adjusted under 35 U.S.C. 154(b) by 0 days.

(21) Appl. No.: 12/911,010

(22) Filed: Oct. 25, 2010

(65) Prior Publication Data
US 2011/0140030 A1 Jun. 16, 2011

Related U.S. Application Data

(62) Division of application No. 10/548,414, filed as application No. PCT/CA2004/000350 on Mar. 10, 2004, now Pat. No. 7,820,737.

(60) Provisional application No. 60/453,970, filed on Mar. 13, 2003.

(51) Int. Cl.
*C08G 83/00* (2006.01)
*C08J 3/05* (2006.01)
*C08K 3/22* (2006.01)
*C08K 9/10* (2006.01)

(52) U.S. Cl. .................. 523/204; 523/200; 523/202

(58) Field of Classification Search .................. 523/204, 523/200, 202
See application file for complete search history.

(56) References Cited

U.S. PATENT DOCUMENTS
5,952,131 A 9/1999 Kumacheva et al.

FOREIGN PATENT DOCUMENTS
WO 01/62830 8/2001

OTHER PUBLICATIONS

Kumacheva et al. "A New Approach to Hybrid Polymer- Metal and Polymer-Semiconductor Particles" Advanced Materials, vol. 14, No. 23, Dec. 3, 2002, pp. 1756-1759.*
Zhang et al, "A New approach to Hybrid Polymer-Metal and Polymer-Semiconductor Particles", Advanced Materials, vol. 14, No. 23, Dec. 3, 2002, pp. 1756-1759.
Kalinina et al, "A Core-Shell Approach to Producing 3D Polymer Nanocomposites", Macromolecules, American Chemical Society, vol. 32, No. 12, 1999, pp. 4122-4129.
Kumacheva et al, "Three-Dimensional Arrays in Polymer Nanocomposites", Advanced Materials, VCH, Feb. 11, 1999, pp. 231-234.

* cited by examiner

*Primary Examiner* — Kelechi Egwim
(74) *Attorney, Agent, or Firm* — Lynn C. Schumacher; Hill & Schumacher

(57) ABSTRACT

Hybrid composite materials with multiscale morphologies are formed by doping polymer submicrometer spheres with semiconductor or metal (e.g. CdS or Ag, respectively) nanoparticles and using these doped microspheres as functional building blocks in production of hybrid periodically structured materials. The preparation of hybrid polymer particles include the following stages: (i) synthesis of monodisperse polymer microspheres, (ii) in-situ synthesis of the inorganic nanoparticles either on the surface, or in the bulk with polymer beads, and (iii) encapsulation of hybrid microspheres with a hydrophobic shell.

23 Claims, 21 Drawing Sheets

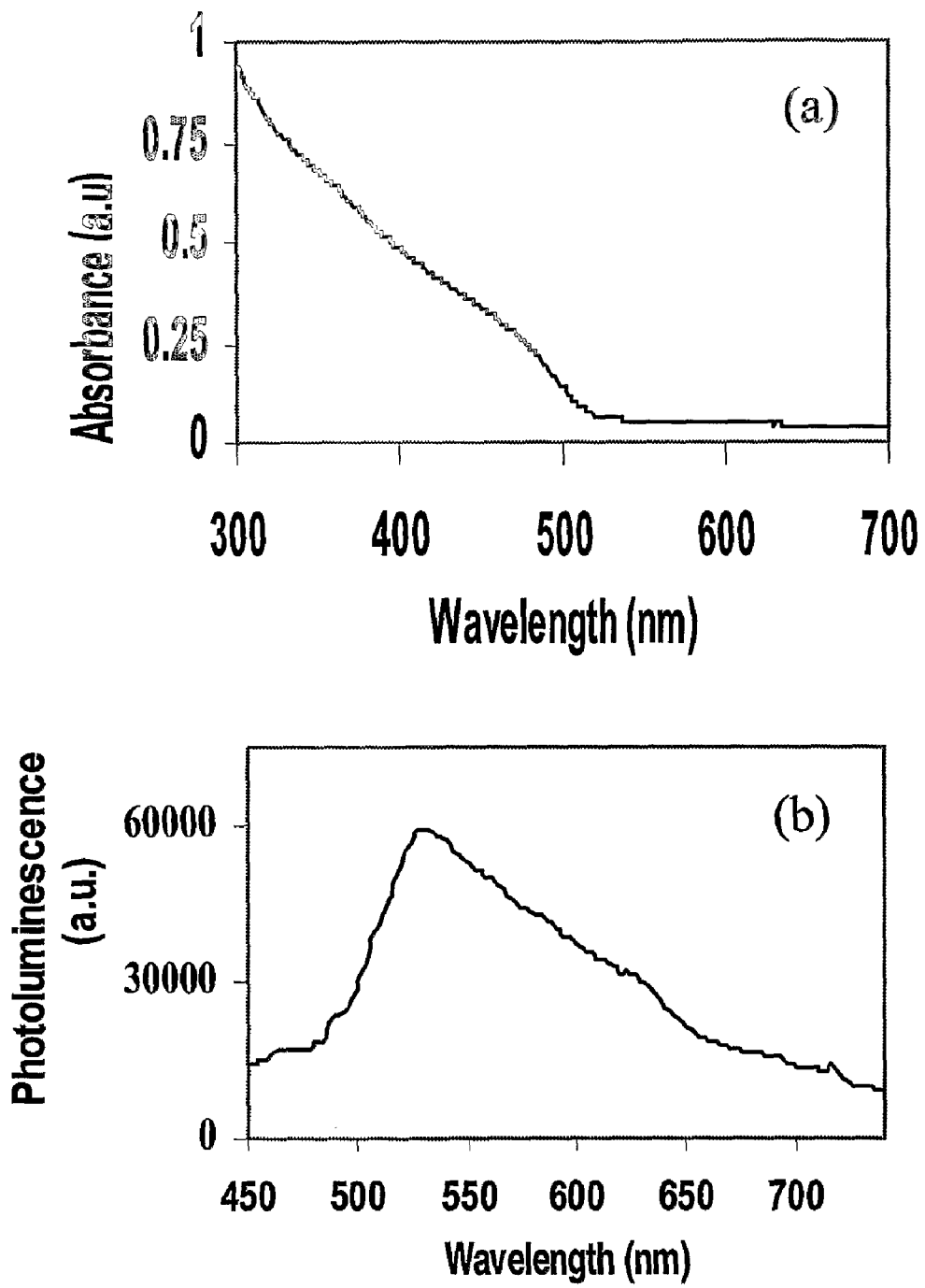
FIGURE 6a,b

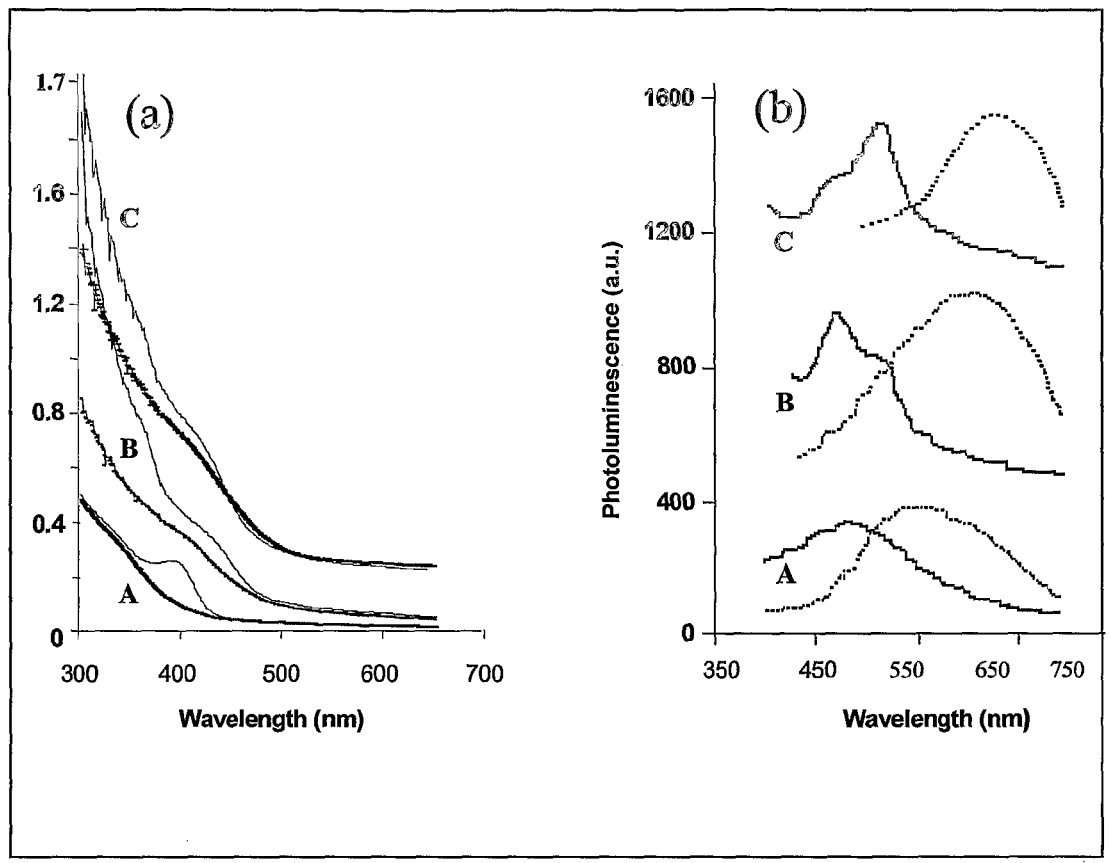
FIGURE 6d, e

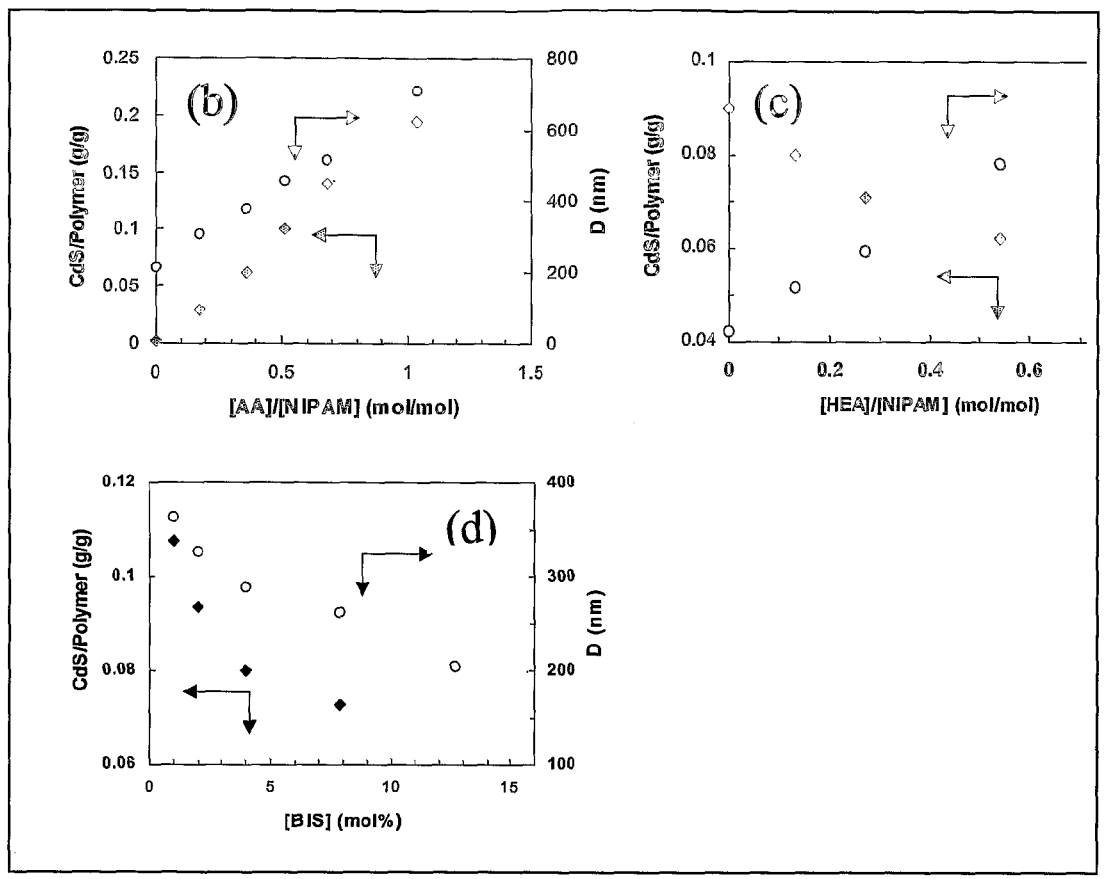
FIGURE 7b-d

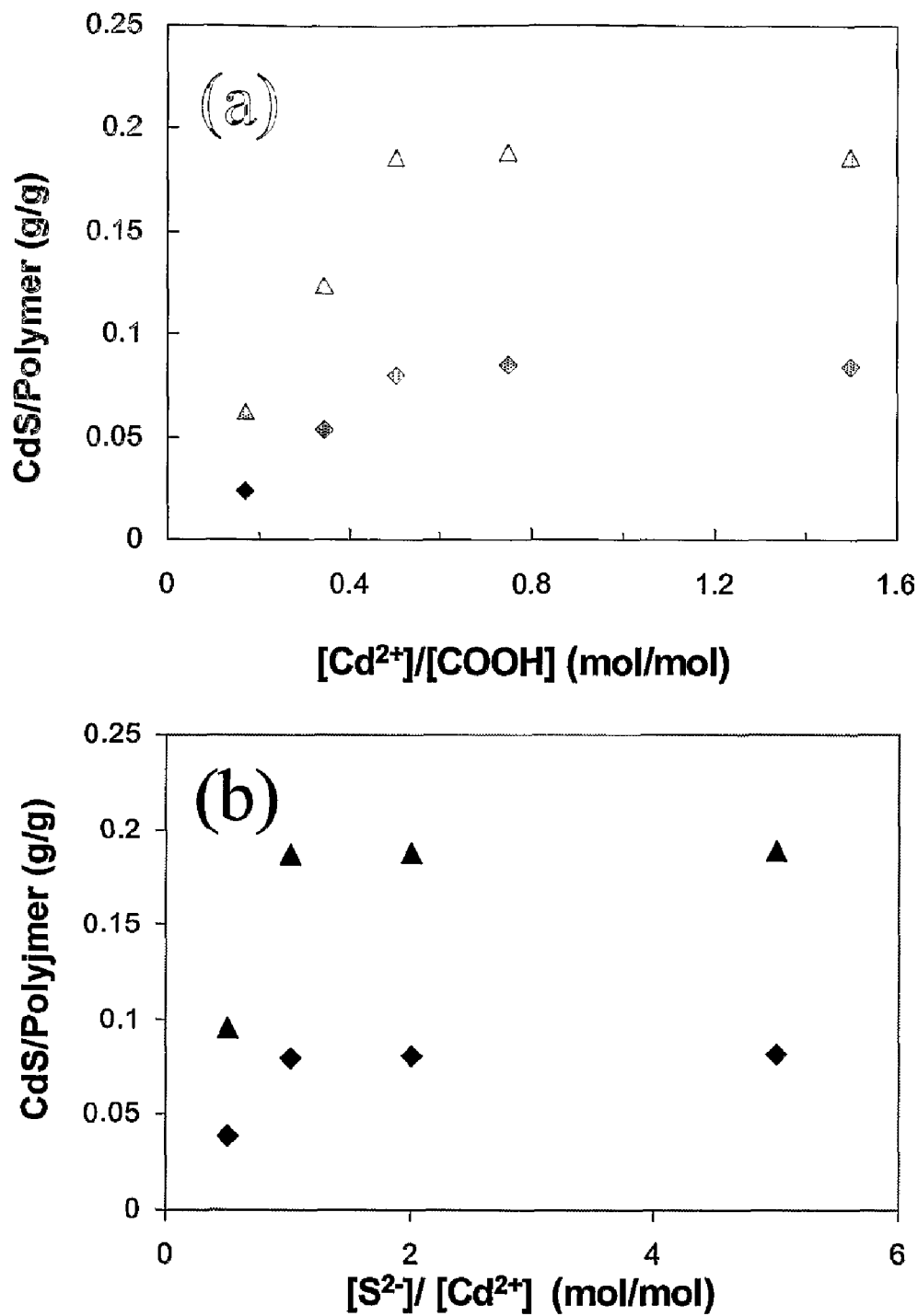
FIGURE 7e,f

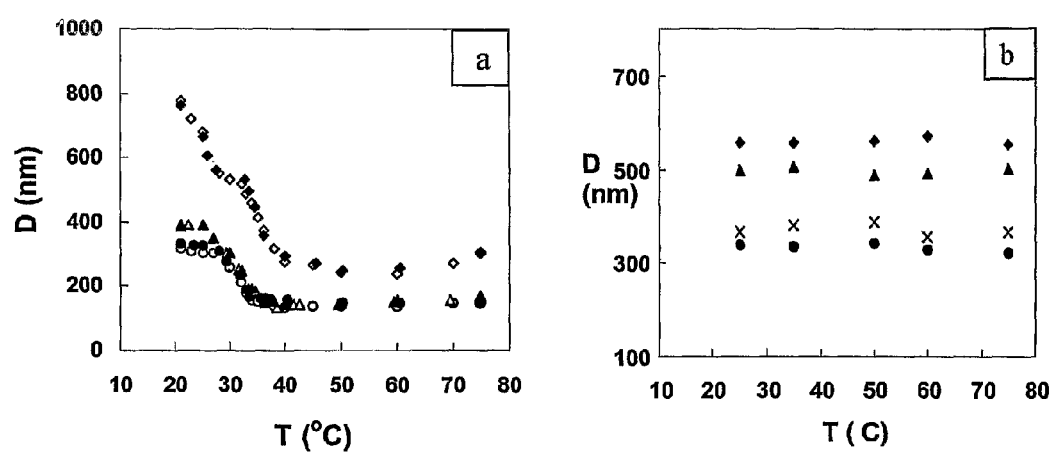
FIGURE 11a,b

METHOD OF PRODUCING HYBRID POLYMER-INORGANIC MATERIALS

CROSS REFERENCE TO RELATED U.S. APPLICATION

This patent application is a Divisional application of U.S. patent application Ser. No. 10/548,414 entitled METHOD OF PRODUCING HYBRID POLYMER-INORGANIC MATERIALS, which is the national phase of PCT/CA04/00350 filed on Mar. 10, 2004, which relates to, and claims the priority benefit from, U.S. Provisional Patent Application Ser. No. 60/453,970 filed on Mar. 13, 2003, all of which are incorporated herein by reference in their entirety.

FIELD OF INVENTION

This invention relates to a method of producing hybrid polymer-inorganic colloidal materials.

BACKGROUND OF THE INVENTION

There is an immense interest in hybrid nanocomposite materials with periodic structures, since they have potential applications in production of photonic or photonic crystals, in optical data storage, in chemical and biochemical sensing, and in optical limiting and switching. Microbeads doped with NPs were used for biological labelling. (Han, M.; Gao, X.; Su, J. Z.; Nie, S. *Nature Biotechnol.* 2001, 19, 631). Photonic crystals produced from microspheres doped with semiconductor NPs showed coupling of structurally- and angularly-dependent electromagnetic resonances (arising from microscale structural periodicity) and optical properties of the semiconductor quantum dots (providing spectral control through the quantum confinement effect) ((a) Blanco, A.; López, C.; Mayoral, R.; Miguez, H.; Meseguer, F.; Mifsud, A.; Herrero, *J. Appl. Phys. Left.* 1998, 73. 1781-1783; (b) Vlasov, Yu. A.; Luterova, K.; Pelant, L; Honerlage, B.; Astratov, V. N. *Appl. Phys. Lett.* 1997, 71, 1616-1618; (c) Lin, Y, Zhang, J.; Sargent, E. H.; Kumacheva, E. *Appl. Phys. Left.* 2002, 81, 3134)). Control over assembly of microspheres doped with magnetic NPs in periodic structures was achieved under the action of magnetic field ((a) Xu, X. L; Majetich, S. A.; Asher, S. A. *J. Am. Chem. Soc.* 2002, 124, 13864; (b) Lyubchanskii, I. L.; Dadoenkova, M. N.; Lyubchanskii, M. I.; Shapovalov, E. A.; Rasing, T. H. *J. Phys. D.* 2003, 36, R277). Alternatively to solid microspheres, colloid crystals produced from microgels or metal NPs-doped microgels were used for the patterning of self-assembled photonic materials. ((a) Hellweg, T.; Dewhurst, C. D.; Bruckner, E.; Kratz, K; Eimer, W. *Colloid Polym. Sci.* 2000, 278, 972; (b) Hu, Lu, X.; Gao, J. *Adv. Mater.* 2001, 13, 1708; (c) Debord, J. D.; Eustis, S.; Debord, S. B,; Lofye, M. T.; Lyon, L. A. *Adv. Mater.* 2002, 14, 658662; (d) Lee, Y.-J,; Braun, P. V.; *Adv. Mater.* 2003, 15, 563-566; (e) Jones, C. D.; Lyon, L. A. *J. Am. Chem. Soc.* 2003, 125, 460)).

A "bottom-top" approach to producing materials with structural hierarchy is particularly attractive to chemists as it is a versatile and simple method to producing such materials. In this strategy, small structural units (building blocks) with useful functionalities are assembled in periodic arrays to produce materials with periodically modulated composition, structure and function.

Recently, the inventor developed a "core-shell" strategy for synthesis and fabrication of periodically structured polymer-based materials. (Kumacheva, E.; Kalinina, O.; Lilge, L. *Adv. Mater.* 1999, 11, 231; Kalinina, O.; Kumacheva, E. *Macromolecules* 1999, 32, 4122; Kalinina, O.; Kumacheva, E. *Chem. Mater.* 2001, 13, 35; Kalinina, O.; Kumacheva, E. *Macromolecules* 2002, 35, 3675). The overview of the "core-shell" approach is given in FIG. 1. Polymer or polymer-based core-shell particles with dimensions varying from 100 nm to several microns are synthesized in Stage A. The essential feature of these particles is a specific relation between the glass transition temperatures, $T_g$, of the core-forming polymer (CFP) and the shell-forming polymer (SFP); the glass transition temperature of the SFP is substantially lower than that of the CFP, that is, $T_{g,SFP} < T_{g,CFP}$. Following synthesis, the core-shell microspheres are assembled in a periodic one-, two-, or three-dimensional array (Stage B) and annealed at the temperature $T_{g,SFP} < T_{annealing} < T_{g,CFP}$ (Stage C). During heat processing the SFP softens, flows, and ultimately forms a continuous matrix, while the CFP remains intact. The morphology of the resulting material is shown in stage C of FIG. 1.

The core-shell particles can be obtained using (a) synthesis of particle cores accompanied by the synthesis of latex shells on the surface of cores, (b) electrostatically-driven heterocoagulation between the oppositely charged large particles of the CFP and small particles of the SFP followed by spreading of the SFP over the surface of the core during heat processing or by (c) controlled phase separation technique (Okubo, M.; Lu, Y., *Colloids Surf. A* 1996, 109, 49; Ottewell, R. H., Schofield, A. B.; Waters, J. A.; Williams, N. S. *Colloid Polym. Sci.* 1997, 275, 274; Furusawa, K., Velev, O. D. *Colloids Surf. A* 1999, 159, 359; Han, J.; Kumacheva, E. *Langmuir* 2001, 17, 7912; Li., H.; Kumacheva, E. *Colloid Polym. Sci.* 2003, 281, 1; Dudnik, V.; Sukhorukov, G. B.; Radtchenko, I. L.; Mohwald, H. *Macromolecules* 2001, 34, 2329).

The core-shell strategy provides several degrees of freedom over morphology and composition of the ultimate material. The "compositional" degrees of freedom can be divided into two groups. First, the core and the shells can be synthesized from the materials with distinct compositions and properties, such as organic or inorganic polymers or conductive and dielectric organic polymers. Alternatively, the encapsulation of inorganic cores with polymeric shells produces core-shell functional building blocks for periodic mesostructured hybrid materials.

In the second strategy, the core-shell particles are synthesized from the similar polymers (still keeping the required relation between their glass transition temperatures), however, in the stage of synthesis or after synthesis, the core and/or the shell are chemically functionalized or physically doped with different low-molecular weight species. As a result of confinement in the microbeads, these species form spatially localized mesoscopic domains in the ultimate composite material. Fluorescent dyes, chromophores, molecules with properties useful in nonlinear optics, and organic and inorganic nanoparticles can be selectively incorporated in the core-shell polymer beads thus tailoring novel optical, magnetic or electric properties to the ultimate material. This approach is shown in FIG. 2 where the nanoparticles are incorporated in the core or the shell of the polymer beads. Alternatively, different nanoparticles can be localized in the cores and shells. Each of these combinations would lead to a particular compositional pattern in the composite material, shown in FIG. 2.

In recent years, the modification of polymer microspheres with inorganic semiconductor nanoparticles (NPs) has stimulated great interest in materials science due to the possibility of combining polymer processibility and intrinsic properties of NPs, such as their catalytic, magnetic and electronic properties. Polymer microbeads were synthesized in the presence of pre-formed NPs (Kronick, P. L.; Campbell, G. L.; Joseph, K. *Science* 1978, 200, 1074; Frank, S.; Lauterbur, P. C. *Science* 1993, 363, 334; Sauzedde, F.; Elaisari, A.; Pichot, C. *Colloid Polym. Sci.* 1999, 277, 1041; Horak, D. J. *Polym. Sci. Part A Polym. Chem.* 2001, 39, 3707; Xu, X.; Friedman, G.; Humfeld, K. D.; Majetich, S. A.; Asher, S. A. *Chem. Mater.* 2002, 14, 1249) or they were mixed with preformed NPs, the latter either adsorbed to the surface of microspheres, or diffused inside the polymer particles. (Haloui, L. I. *Langmuir* 2001, 17, 7130).

Alternatively, NPs were synthesized in-situ, that is, inside polymer spheres, e.g., in ion-exchange resin beads or in microgel particles. (Winnik, F M.; Morneau, A.; Ziolo, R. F.; Stoever, H. D.; H.; Li, W.-H. *Langmuir* 1995, 11, 3660; (b) Antonietti, M.; Grohn, F.; Hartmann, J.; Bronstein, L. *Angew. Chem. Int. Engl. Ed.* 1997, 36, 2080).

Among these methods, the in-situ synthesis provides a higher doping level, precise control over NP size and a more homogenous distribution of the NPs in the polymer microsphere.

It would be desirable to provide a method of producing composite colloidal polymer/inorganic nanoparticle materials economically and which is versatile allowing one to tune the properties of the nanoparticles by changing the composition of the colloidal polymer. These colloidal polymer/inorganic nanoparticle materials could then act as the functional building blocks in fabrication of hybrid nanocomposite materials.

SUMMARY OF THE INVENTION

The present invention discloses several processes to produce multiscale hybrid polymeric/inorganic materials with periodic structures. Such materials are produced by doping polymer core-shell particles with metal, semiconductor, or magnetic nanoparticles (NPs) that were sufficiently small to provide the quantum confinement effect or achieve superparamagnetic properties. The intrinsic feature of the method disclosed herein is the in-situ synthesis of the NPs on the surface or in the bulk of the polymer microspheres; this feature led to a good control over the size of the NPs by spatially localizing their nucleation and growth sites.

In one aspect of the invention there is provided a process of synthesizing a composite colloidal polymer-inorganic material, comprising the steps of:

a) synthesizing a dispersion including polymer microparticles in a liquid;

b) treating said dispersion of polymer microparticles to modify an outer surface of the polymer microparticles to provide an effective concentration of ligands on the outer surface of the polymer microparticles, the ligands being selected to form a complex with atoms of a metal, ions of the metal, or molecular moieties containing the metal at the surface of the polymer microparticle;

c) adding atoms of the metal, ions of the metal, or molecular moieties containing the metal to the dispersion of polymer microparticles under conditions suitable to facilitate formation of a complex between the ligands and the atoms of the metal, ions of the metal, or molecular moieties at the surface of the polymer microparticles; and d) exposing the dispersion of polymer microparticles to an effective agent which interacts with the atoms of a metal, ions of the metal, or molecular moieties containing the metal to form nanoparticles on the outer surface of the polymer microparticles, the nanoparticles being comprised of at least the metal, the effective concentration of ligands being selected to give nanoparticles with specified material properties.

In another aspect of the invention there is provided a process of synthesizing a composite colloidal polymer-inorganic material, comprising the steps of:

a) synthesizing a dispersion including polymer microgel particles in a liquid;

b) treating said dispersion of polymer microgel particles to modify an interior of the polymer microgel particles to provide an effective concentration of ligands in the interior of the polymer microgel particles, the ligands being selected to form a complex with atoms of a metal, ions of the metal, or molecular moieties containing the metal in the interior of the polymer microparticle;

c) adding atoms of the metal, ions of the metal, or molecular moieties containing the metal to the dispersion of polymer microgel particles under conditions suitable to facilitate uptake of the atoms of the metal, ions of the metal, or molecular moieties into the interior of the polymer microgel particles;

d) exposing the dispersion of polymer microgel particles to a first effective agent which interacts with the atoms of the metal, ions of the metal, or molecular moieties in the interior of the polymer microgel particles to form nanoparticles in the interior of the polymer microgel particles, the nanoparticles being comprised of at least the metal, the effective concentration of ligands being selected to give nanoparticles with specified material properties;

e) exposing the polymer microgel particles to a second effective agent which results in the polymer microgel particles expelling the liquid therefrom which causes the polymer microgel particles to contract in volume; and f) encapsulating the contracted polymer microgel particles with the nanoparticles in the interior thereof in a protective polymeric shell material, the protective polymeric shell material being effective to suppress interactions between the contracted polymer microgel particles and the liquid.

In another aspect of the present invention there is provided a process of synthesizing a composite colloidal polymer-inorganic material, comprising the steps of:

a) synthesizing a dispersion including polymer microparticles in a liquid;

b) encapsulating the polymer microparticles in a shell forming polymer microgel prepared by, treating the polymer microparticles to provide an effective concentration of ligands, the ligands being selected to form a complex with atoms of a metal, ions of the metal, or molecular moieties containing the metal at the surface of the polymer microparticles, adding atoms of the metal, ions of the metal, or molecular moieties containing the metal to the shell forming polymer microgel under conditions suitable to facilitate formation of a complex between the ligands and the atoms of the metal, ions of the metal, or molecular moieties at the surface of the polymer microparticles, and exposing the polymer microgel to an effective agent which interacts with the atoms of a metal, ions of the metal, or molecular moieties containing the metal to form nanoparticles dispersed throughout the polymer microgel, the nanoparticles being comprised of at least the metal, the effective concentration of ligands being selected to give nanoparticles with specified material properties;

c) exposing the polymer microgel to a second effective agent which results in the polymer microgel particles expelling the liquid therefrom which causes the polymer microgel to contract in volume around the polymer microparticles; and d) annealing the polymer microparticles encapsulated in the shell forming polymer microgel having the nanoparticles embedded therein to form a periodic array of polymer microgel particles.

BRIEF DESCRIPTION OF DRAWINGS

The following is a description, by way of example only, of the method of producing hybrid polymer-inorganic materials in accordance with the present invention, reference being had to the accompanying drawings, in which:

FIG. 6a, b shows ultraviolet (UV)-visible spectra (a) and photoluminescence spectra (b) of CdS nanoparticles synthesized on the surface of PMMA-PMAA microspheres shown in FIG. 5a. PMMA/PAA weight ratio is 0.44. $\lambda_{ex}$=380 nm;

FIG. 6d,e shows UV-Visible absorbance (d) and photoluminescence spectra (e) of CdS NPs synthesized in PNIPAM/PAA/PHEA microgels before (-) and after heat processing (- - -). [PAA]/[PHEA]/[PNIPAM]=0.36/0.13/1, [BIS]=4 mol %; [COOH]/[Cd$^{2+}$]/[S$^{2-}$]=110.5/0.5. From top to bottom CdS concentration in microgels is 0.027 (A), 0.054 (8), and 0.08 (C) g/g polymer. A rising baseline characteristic of semiconductor nanoparticles obscures absorption data at wavelengths significantly lower than the absorption maximum. $\lambda_{ex}$=380 nm. $\lambda_{ex}$=380 nm.

FIG. 7b shows the variation in concentration of CdS NPs in microgels (◇) and in microgel size (○) plotted versus (a) fraction of AA in microgels for molar ratio [HEA]/[NIPAM] 0.54; [BIS]=4 mol %;

FIG. 7c shows the variation in concentration of CdS NPs in microgels as a function of fraction of HEA in microgels for [AA]/[NIPAM]=0.36; [BIS]=4 mol %;

FIG. 7d shows the variation in concentration of CdS NPs in microgels as a function of concentration of crosslinking agent for [AA]/[HEA]/[NIPAM]=0.36/0.13/1, the molar ratio [COOH]/[Cd$^{2+}$]/[S$^{2-}$] was 1/0.5/0.5 and the microgels were ionized at pH=8.3;

FIG. 7e shows the variation in CdS NP concentration in microgel as a function of molar ratio [Cd$^{2+}$]/[COOH], the microgel composition was: [AA]/[HEA]/[NIPAM]=0.36/0.13/1, [BIS]=4 mol % (◆); [AA]/[HEA]/[NIPAM]=1.03/0.13/1; [BIS]=4 mol % (▲), and the microgel particles were ionized at pH=8.3;

FIG. 7f shows the variation in CdS NP concentration in microgel as a function of molar ratio [S$^{2-}$]/[Cd$^{2+}$], the microgel composition was: [AA]/[HEA]/[NIPAM]=0.36/0.13/1, [BIS]=4 mol % (◆); [AA]/[HEA]/[NIPAM]=1.03/0.13/1; [BIS]=4 mol % (▲), and microgel particles were ionized at pH=8.3.

FIG. 11a is the variation in microgel diameter as a functrion of temperature at pH=4.2. Open and solid symbols correspond to poly(NIPAM-M-HEA) microgel and poly (NIPAM-AA-HEA) microgel doped with CdS NPs, respectively. AA/NIPAM weight ratio 0.44 (◇,◆), 0.22 (△,▲) and 0.11 (○,●).

FIG. 11b gives the variation in diameter of hybrid core-shell particles as a functrion of temperature at pH=4.2 after encapsulation with a hydrophobic poly(MMA-BMA-AA) core, the weight ratio MMA/BMA/AA) is 15/4/1 and the AA/NIPAM weight ratio 0.44 (◇,◆), 0.22 (△,▲) and 0.11 (○,●);

FIG. 11d is an optical transmission spectrum of the colloid crystals of FIG. 9a.

DETAILED DESCRIPTION OF THE INVENTION

Abbreviations:

PMMA is poly(methyl methacrylate); PBMA is poly(butyl methacrylate); PS is polystyrene; PMAA is poly(methyl methacrylic acid); AA is acrylic acid; PM is polyacrylic acid; NIPAM is N-isopropyl acrylamide; PNIPAM is poly(isopropyl acrylamide); HEA is 2-hydroxyethyl acrylate; PHEA is poly(2-hydroxyethyl acrylate); Poly(NIPAM-AA-HEA) is poly(N-isopropyl acrylamide-acrylic acid-2-hydroxyethyl acrylate).

The present invention provides a method for synthesizing polymer-based colloidal microparticles having inorganic nanoparticles grown either in the interior of the microparticles or on the surface of the microparticles. The method can be used to control material properties of the inorganic nanoparticles such as nanoparticle size, crystallinity and morphology, a critical feature controlling various electronic, optical and magnetic properties of the resulting colloidal microparticles.

In one embodiment of the invention hybrid core-shell polymer microspheres comprised of microparticle cores covered with a polymeric shell are used as the functional building units in production of multiscale hybrid polymer-based materials. The synthesis of the inorganic nanoparticles may be conducted in different stages of the preparation of polymer core-shell particles so that the nanoparticles may be (a) incorporated in the microparticle core, (ii) localized at the interface between the core and the shell, or (iii) introduced in the particle shell. The material may be produced with the nanoparticles incorporated into the shell structure in a manner similar to the incorporation of nanoparticles in the core: making a gel-like shell, synthesizing nanoparticles, and the collapsing (shrinking) the gel-like shell.

The method of the present invention has been exemplified using three types of inorganic nanoparticles, namely semiconductor (CdS), the pure metal (Ag) and magnetic ($Fe_3O_4$) nanoparticles. CdS nanocrystals with a 6 nm exciton diameter and a 2.5 eV band gap (Henglein, A. *J. Phys. Chem.* 1982, 86, 2291) show potential applications in solar cells and nonlinear optics devices, whereas electronic properties of Ag nanocrystals can be utilized in catalysis, optical switching and optical storage devices (Belloni, *J. Curr. Opin. Colloid Interf. Sal.* 1996, 1, 184). Microgels doped with and magnetic $Fe_3O_4$ nanoparticles can be used in separation techniques and drug delivery systems.

Figure 3A:
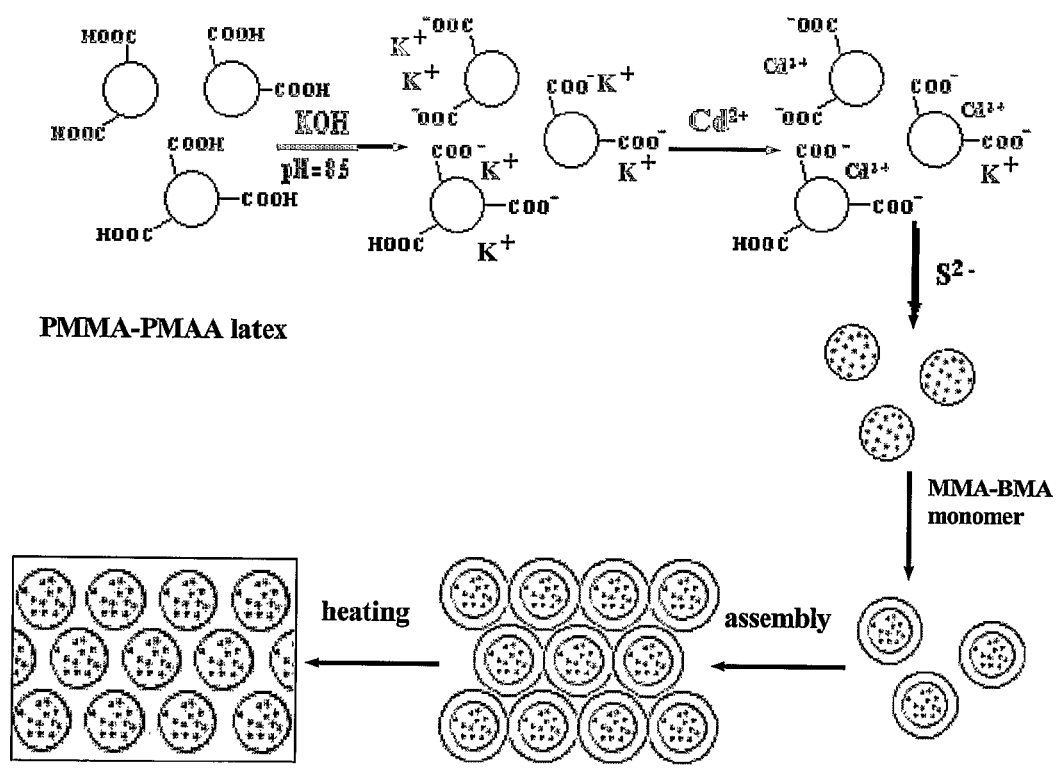
FIG. 3a shows a synthetic route used for in-situ synthesis of semiconductor, metal or magnetic nanoparticles on the surface of poly(rnethyl methacrylate-methacrylic acid) latex beads and their encapsulation to produce hybrid core-shell particles.
Figure 3B:
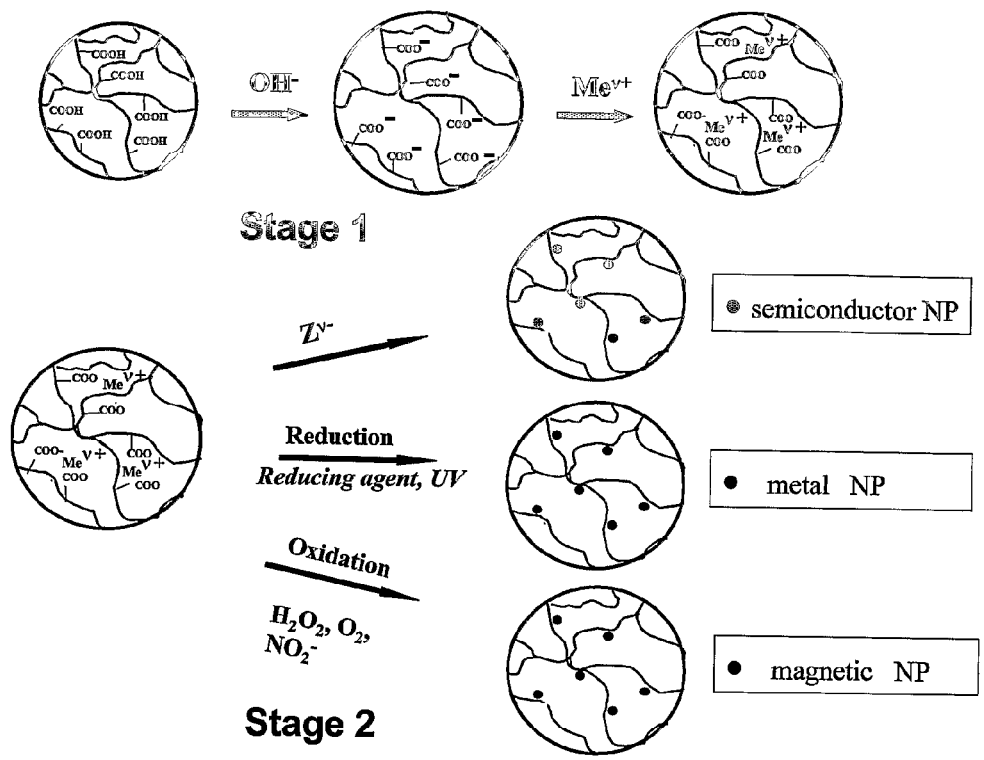
FIG. 3b shows a synthetic route used for in-situ synthesis of semiconductor, metal or magnetic nanoparticles in the interior of poly(N-isopropyl acrylamide-acrylic acid-2-hydroxyethyl acrylate) microgels.

FIGS. 3a shows a synthetic route used for the preparation of polymer microbeads doped with CdS nanoparticles. FIG. 3b shows the synthetic route to the preparation of semiconductor, metal and metal oxide nanoparticles in the interior of microgels. All routes involved the preparation of the polymer microspheres containing carboxyl groups, deprotonation of COOH groups, ion exchange between the counter-ions in the double electrical layer of the microbeads and metal ions from the intervening medium, the reaction between cations and anions leading to the formation of semiconductor nanoparticles, reduction of cations to produce metal nanoparticles or oxidation of cations to obtain metal oxide (magnetic) nanoparticles. This step could be followed by encapsulation of the nanoparticle-modified mesospheres with a polymeric shell. The difference, between the two routes shown in FIG. 3a and FIG. 3b was in the localization of the nanoparticles. For the condensed latex beads (FIG. 3a) the nanoparticles were synthesized on the surface of the microspheres, whereas when polymer microgel particles were used as microreactors, the nanoparticles were synthesized in the bulk of the microspheres (FIG. 3b).

For the synthesis of Ag nanoparticles following an increase in pH to ionize carboxyl groups, the latex dispersion or the microgel dispersion was treated with an aqueous solution of $AgNO_3$. $NaBH_4$ was then added as the reducing agent at 0° C.

Magnetic $Fe_3O_4$ NPs were prepared in the interior of microgels using a co-precipitation technique. A 1.0 M aqueous KOH solution was added to 200 ml of poly(NIPAM-AA-HEA) microgel dispersion ([COOH]=3.0 mM) to achieve pH=6.3±0.3. The system was purged with $N_2$, mixed with 1.05 g of $FeSO_4·7H_2O$ and stirred overnight. After dialyzing the dispersion under a $N_2$ atmosphere, 0.104 g of $NaNO_2$ was added under stirring. Then, 12.5 mL of 28 wt % ammonia solution was quickly introduced into the system under vigorous stirring. The color of the dispersion became green and after ca. 2 h turned to black. The resulting dispersion was dialyzed against the deionized water under a $N_2$ atmosphere.

The polymer colloidal microparticles particles were prepared using styrene, methyl methacrylate (MMA), methacrylic acid (MAA), acrylic acid (AA), 2-hydroxyethyl acrylate (HEA), butyl acrylate (BA), butyl methacrylate (BMA), and ethylene glycol dimethacrylate (EGDMA) purchased from Aldrich Canada. All monomers were purified by vacuum distillation. N-isopropyl acrylarnide (NIPAM, Scientific Polymer Products, Inc.), N,N'-methylenebisacrylamide (BIS), potassium persulfata (KPS), potassium hydroxide (KOH), cadmium perchlorate hydrate ($Cd(ClO4)_2.xH_2O$, sodium dodecyl sulfate (SDS), sodium sulfide nonohydrate ($Na_2S.9H_2O$), silver nitrate ($AgNO_3$), sodium borohydride ($NaBH_4$) (all from Aldrich Canada), 2,2'-azobis(2-methyl propionitrile) (AIBN, Kodak), and isooctyl-3-mercaptopropionate (IOMP, TCI America) were used as received. The water was deionized to 18.2 MΩ·cm and pH≈5.5 (Millipore Milli-Q).

Three types of monodisperse microspheres were used including 1) poly(methyl methacrylate-methacrylic acid) (PMMA-PMAA) latex, 2) crosslinked poly(styrane-acrylic acid) (PS-PM) latexes transforming to a microgel at high pH, and 3) poly(N-isopropyl acrylamide-acrylic acid-2-hydroxyethyl acrylate) (PNIPAM-PAA-PHEA) microgels. It will be understood that while a preferred embodiment of the present invention uses substantially monodisperse microspheres, the invention is not limited to microspheres, but other colloidal particle shapes may be used, e.g. ellipsoidal, rods and the like.

PMMA-PMAA and PS-PAA particles were prepared using surfactant-free emulsion polymerization. Both dispersions were purified by centrifugation, decantation, redispersion in the deionized water, and dialysis against water.

The PNIPAM-PAA-PEHA microgels were prepared by precipitation polymerization in aqueous solutions in the presence of a small amount of SDS. (Pelton, R. H.; Chibante, P. *Colloids Surf.* 1986, 20, 247; Pelton, R. *Adv. Colloid Polym. Interf. Sci.* 2000, 85, 1). To remove SDS and other impurities, the dispersion was purified to by successive centrifugation, decantation, redispersion in the deionized water, and dialysis.

For the synthesis of CdS NPs on the surface of PMMA-PMAA beads, the latex dispersion with ca. 20 wt % of polymer particles was treated with 0.1M KOH solution, dialyzed to pH=8.5, treated with a 1M solution of $Cd(ClO_4)_2$ and then maintained under stirring for 4 h. The liquid medium with unreacted $Cd^{2+}$-ions was removed by centrifugation; following this step the precipitate was redispersed in the deionized water. Then, a 1M aqueous solution of $Na_2S$ was slowly introduced into the dispersion under stirring. The resulting dispersion was centrifuged, redispersed in water, and dialysed. Following dialysis, the dispersion preserved a yellow or orange color, which indicated that CdS nanoparticles were not removed from the surface of latex beads.

For the synthesis of Ag nanoparicles on the surface of polymer microbeads, after addition of KOH and dialysis, a 0.1 M aqueous solution of $AgNO_3$ was added to the dialyzed dispersion. Following several centrifugation-redispersion cycles, $Ag^+$-ions incorporated in the double electrical layer of the latex particles were reduced at 0° C. using a freshly prepared 0.1M aqueous solution of $NaSH_4$. The dispersion instantly became dark-brown. After stirring overnight, the dispersion was purified by centrifugation (to remove unattached Ag nanoparticles) and then dialyzed.

The preparation of PS-PM and POLY(NIPAM-AA-HEA) microgels doped with CdS and nanoparticles was very similar, however the polymer dispersions were significantly more dilute and they contained only 1-2 wt % of the polymer particles although concentrations up to 15% may be used.

Once the core polymer microparticles with the nanoparticles on the surface or in the interior were prepared, hybrid core-shell particles were prepared by surfactant-free emulsion polymerization of the shell-forming polymer on the surface of the NP-modified cores. PMMA-PMAA microbeads coated with CdS or Ag NPs were used as seeds for interfacial polymerization of poly(methyl methacrylate)-poly(butyl methacrylate) shell (weight ratio poly(methyl methacrylate)/poly(butyl methacrylate) was 1/1). PS-PAA cores doped with NPs were encapsulated with polystyrene-poly(methyl methacrylate)-polyacrylic acid-poly(butyl methacrylate) copolymer (weight ratio 2.5/10/1/2.5, respectively). Hybrid PNIPAM-PAA-PEHA cores were encapsulated with a hydrophobic poly(methyl methacrylate)-poly(butyl acrylate)-polyacrylic acid shell (weight ratio 15/4/1, respectively).

The concentration of carboxyl groups (COOH) in the polymer microspheres was determined by potentiometric titration (using a method disclosed in Makino, K.; Agate, H.; Ohshima, H. *J. Colloid Interf. Sci.* 2000, 230, 128) using a PH/mV/TEMP meter (Model P25, EcoMet Inc, USA). The freeze-dried sample (0.1 g) was re-dissolved in 0.1 M aqueous solution of sodium hydroxide (NaOH, 20 mL) and stirred overnight. The excess NaOH was titrated with a 0.05M aqueous HCl solution.

The dimensions and polydispersity of the core polymer particles were measured using photon correlation spectroscopy (PCS) (Zetasizer $3000HS_4$, Malvern Instruments, U.K.). For each temperature, the dispersions of microparticles were equilibrated for 30 min.

A Varian Cary 500 spectrophotometer was used to obtain UV-Vis absorption spectra of the NPs incorporated in the polymer microspheres. Generally, to suppress scattering the dispersions of PMMA-PMAA or PS-PAA beads were diluted with dimethyl sulfoxide, a solvent with a high refractive index (n=1.4790). Photoluminescence spectra of CdS NPs were acquired on a Spee FluoroMax spectrometer ($\lambda$=380 nm).

The morphology of the hybrid microspheres was studied on gold-coated samples using a Hitachi S-570 scanning electron microscope (SEM) operated at an acceleration voltage of 15 kV, and a Hitachi 600 transmission electron microscope (TEM) at 70 kV. The TEM samples were prepared by placing a small drop of the aqueous suspension on a carbon film supported by a copper grid (Electron Microscope Sciences, Inc., PA, USA). High-resolution TEM images were obtained using a JEOL 2010F microscope operated at 200 kV. The morphology of the material produced from the polymer microspheres doped with CdS NPs was studied by LCFM using a Carl Zeiss LSM510 confocal microscope with lateral and the vertical resolutions of 0.23 and 0.29 µm, respectively. The 364 nm line was employed for the excitation of the fluorescent dye. All images were analyzed using the ImageTool for Windows (Version 1.28) software (Univeristy of Texas, Health Science Center, San Antonio, USA).

The structure of CdS and $Fe_3O_4$ NPs was characterized using X-ray powder diffraction (X'Pert Philips Materials Research Diffractomer) using Cu $K_\alpha$ radiation ($\lambda$=1.54178 Å) at 40 kV and 50 mA at a scanning speed of 0.02° $s^{-1}$ in the 2$\theta$ range 5-75°.

Measurements of magnetic properties of $Fe_3O_4$ NPs were carried out on a Quantum Design, Inc. Model PPMS-9 superconducting quantum interference device (SQUID) susceptometer at 300 K.

The size and monodispersity of polymer microspheres were important parameters in production of hybrid composite materials with periodic structures, since they determined the characteristic length scale and periodicity of the ultimate material. In addition, the amount or concentration of carboxyl groups on the surface or in the bulk of the polymer particles was vital in synthesis of nanoparticles. Therefore, these three parameters were chosen as the main criteria in synthesis of polymer micropsheres. The concentration of carboxyl groups is important because the nucleation and growth of the nanoparticles is determined by the spatial localization of carboxyl groups: too low a concentration of carboxyl groups leads to the formation of large nanoparticles separated by large distances, whereas too high a concentration of carboxyl groups results in a very small distance the nucleation sites and the nanoparticles aggregate.

Figure 4:
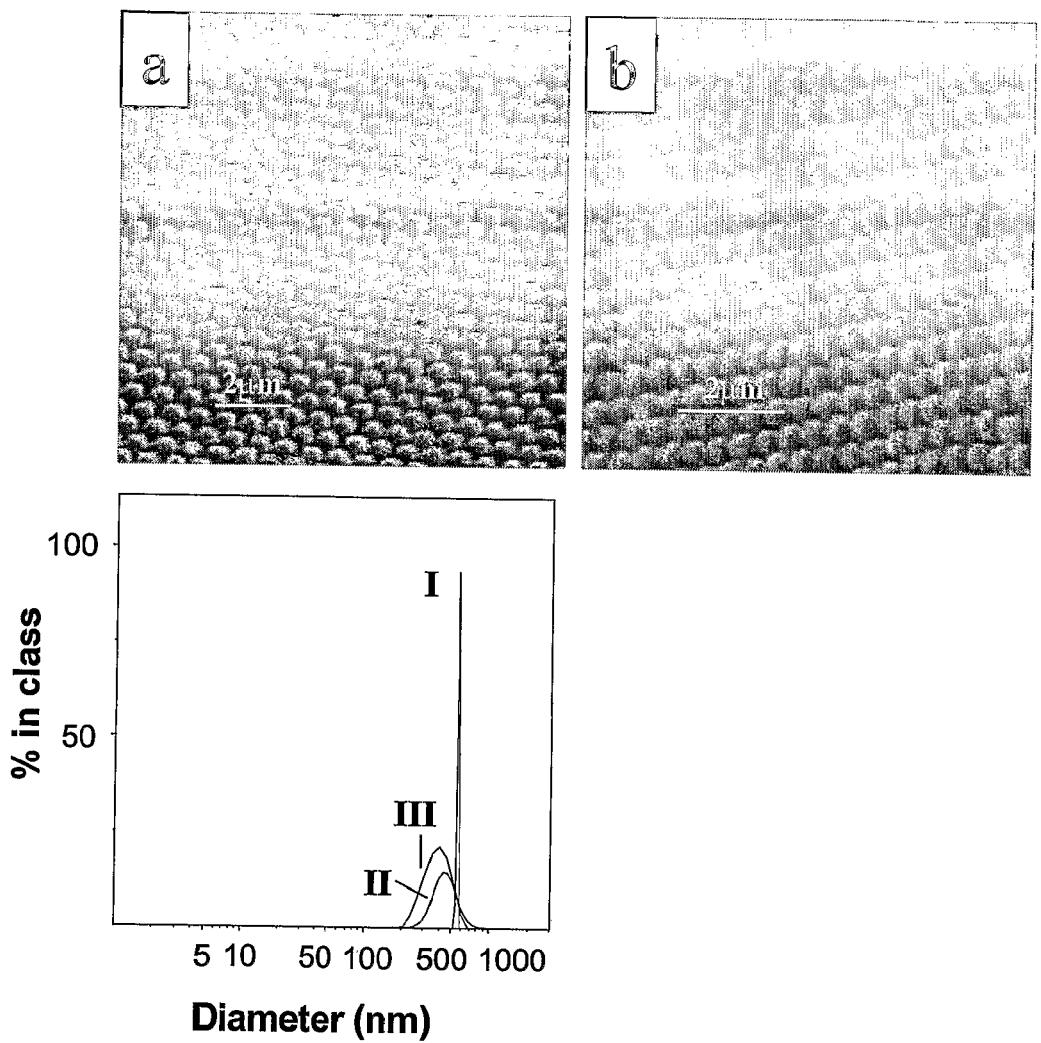
FIG. 4 shows scanning electron micrographs SEM images of (a) PMMA-PMAA beads; PMMA/PMAA weight ratio is 5/1, pH=4.55; (b) PS-PAA beads; PS/PAA ratio is 1/1, pH=3.45; (c) size distribution of PMMA-PMAA latex particles (I); PS/PAA latex particles (II), poly(NIPAM-AA-HEA) microgels (III) at (NIPAM/AA/HEA ratio is 1/0.22/0.5, pH=4.45)

Since the polymerization reaction occurred in a starve-fed regime (that is, the ratio of the polymer constituents in the polymer micropsheres was the same as in the monomeric mixture added to the reactor), the concentration of COOH groups was determined by the weight ratio of the reacting monomers. Generally, the weight ratio PMMA/PMAA varied from 10/1 to 4/1. The diameter of the latex particles varied from 150 to 600 nm. FIG. 4*a* shows the SEM image of the PMMA-PMAA microspheres obtained for PMMA/PMAA weight ratio 5/1, whereas FIG. 4*c*, curve (I) shows the size distribution of these beads.

To obtain a stable dispersion of PS-PAA latex, the weight ratio PS/PAA was generally 1/1, that is, the fraction of PM was relatively high. Following polymerization conducted at pH=3.45, the diameter of the microspheres was ca 450 nm. The SEM image and the size distribution of these microspheres are shown in FIGS. 4*b* and 4*c* (curve (II), respectively. The dimensions of the PS-PAA latex showed a strong dependence on pH: following increase in pH from 3.45 (reaction conditions) to 10, the dimensions of the latex beads increased from 450 to 680 nm. Such increase in size was caused by the deprotonation of PAA in the microparticles, which resulted in a strong repulsion between the polymer chains and conversion of the latex particles into a microgel.

In contrast to PS-PAA microbeads transformed into microgels at elevated pH by ionization of carboxyl groups of PM, the Poly(NIPAM-AA-HEA) particles were synthesized as a microgel. The particle size and polydispersity depended on several factors, such as the weight ratio NIPAM/AA/HEA, and SDS and BIS concentration. Generally, the diameter of microgels varied from 200 to 500 nm, as determined by photon correlation spectroscopy. A typical size distribution curve of the NIPAM/AA/HEA microgel is shown in FIG. 4*c*

(III). The SEM image of the Poly(NIPAM-AA-HEA) microgels is unavailable due to spreading of the polymer on the SEM stubs.

The ionization of carboxyl groups was a crucial step of the approach used in the present work. The optimum extent of ionization depended on the type of the NPs and the desired doping level of the microspheres with NPs. Generally, the range of pH was determined by the following two factors. Increase in extent of protonation of acid groups in the polymer microspheres (that is, increase in pH) led to the increase in the rate and extent of ion uptake from the liquid medium (a) Clay, R. T.; Cohen, R. E. *Supermol. Sci.* 1998, 5, 41. (b) Kane, R. S.; Cohen, R. E.; Silbey, R. *Chem. Mater.* 1999, 11, 90). On the other hand, the maximum value of pH was limited by the solubility of the corresponding metal hydroxides, that is, by the value of the solubility product constant $K_{sp}$. For example, $K_{sp}$ of $Cd(OH)_2$ was $7.2 \times 10^{-15}$ and generally, the maximum value of pH did not exceed 8.6 (*CRC Handbook of Chemistry and Physics*, 81st ed.; CRC Press: Cleveland, 2000).

Figure 5:
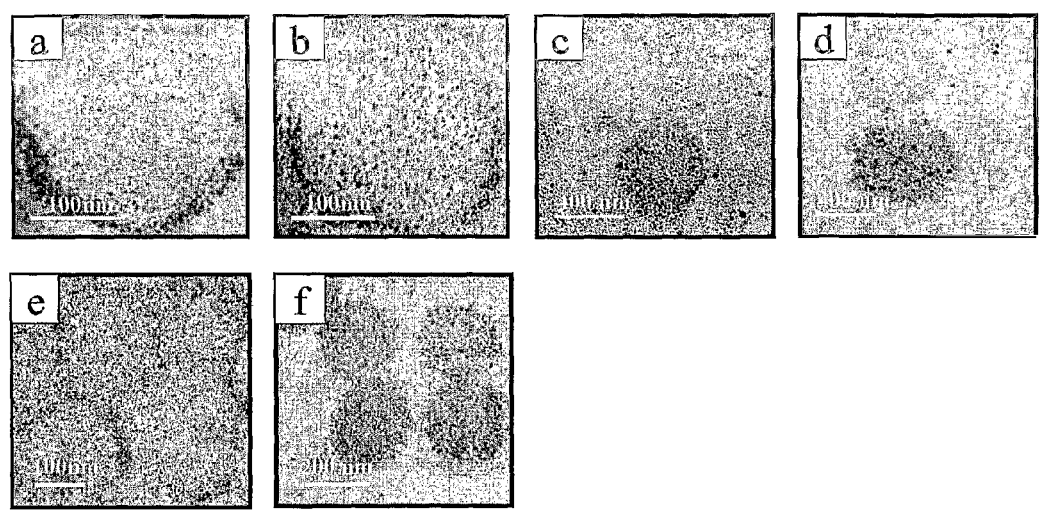
FIG. 5 shows transmission electron micrographs (TEM) images of NP-doped polymer microspheres: PMMA-PMAA beads coated with (a) CdS NPs, (b) Ag NPs (PMMA/PMAA weight ratio 5/1, pH=6.5); PS-PAA microgels doped with (c) CdS NPs, (d) Ag NPs (PS/PAA weight ratio 1/1, pH=6.7; poly(NIPAM-AA-HEA) microgels doped with (e) CdS NPs, (f) Ag NPs (PNIPAM/PAA/PHEA weight ratio is 1/0.22/0.5, pH=6.5)

Following synthesis of the nanoparticles, the size and polydispersity of the PMMA-PMAA beads underwent a very insignificant change. FIGS. 5a and 5b shows representative TEM images of the polymer microspheres doped with CdS and Ag nanoparticles. In FIGS. 5a and 5b, 580-nm size PMMA-PMAA microspheres are uniformly coated with CdS and Ag NPs, respectively. Image analysis of the TEM micrographs showed that ca. 40% of the area of the latex beads was covered with the NPs. The size of the nanoparticles varied from 4 to 7 (CdS NPs) and from 4 to 5 nm (Ag NPs), depending on the PAA fraction in the polymer microspheres and on the molar ratios $[COOH]/[Cd^{2+}]$ and $[Cd^{2}]/[S^{2}]$.

The PS-PAA microgels doped with CdS or Ag nanoparticles (FIGS. 5c and 5d) had similar morphologies. The dimensions of CdS and Ag nanoparticles synthesized in PS-PAA microgels were 5±1 and 4±1 nm, respectively, whereas their concentrations (obtained from image analysis) were 52 and 47 vol %, respectively. This doping level was lower than that anticipated from the stoichiometric ratio $COOH^-/Cd^{2+}$ or $COOH^-/Ag^+$, perhaps, because diffusion of the metal ions in the hydrophobic polystyrene environment was suppressed. A multi-step doping process did not lead to significant increase in concentration of the nanoparticles in PS-PAA microgel. FIGS. 5e and 5f show TEM images of microgels doped with CdS and Ag nanoparticles, respectively. The average size of the CdS nanocrystals varied from 4 to 6 nm, while Ag nanoparticles were 2-3 nm large. On the basis of image analysis, loading of the microgel spheres with nanoparticles increased with increasing polyacrylic acid concentration and it could reach up to ca. 10 vol %. The dimensions of CdS nanoparticles in the microspheres could also be controlled by varying $\phi$: increase in weight fraction of polyacrylic acid in the microgel increased the number of NP nucleation sites, which led to the reduction of nanoparticle size.

The dimensions of Ag and CdS nanoparticles synthesized on the surface or in the bulk of the polymer microbeads were further characterized by UV-visible spectroscopy. The absorption spectrum of the CdS nanoparticles on the surface of PMMA-PMAA microbeads is shown in FIG. 6a. The maximum centered around 486 nm corresponded to the average size of CdS NPs of 5.0 nm, while the edge at 515 nm was related to the largest size of CdS NPs of ca. 6.8 nm, (Spanhel, L.; Haase, M.; Weller, H.; Henglein, A. *J. Am. Chem. Soc.* 1987, 109, 5649; Moffitt, M.; Vali, H.; Eisenberg, *A. Chem. Mater.* 1998, 10, 1021), in reasonable agreement with the results obtained by TEM.

The very small Ag nanoparticles, upon illumination with UV light exhibit fluorescence (data not shown). This is the intrinsic property of very small NPs, which was achieved because of the in-situ synthesis.

The photoluminescence spectrum of CdS nanoparticle is shown in FIG. 6b. Photoluminescence was excited at 380 nm. The emission peak appears around 525 nm, and a long tail extended into 650 nm, similar to that reported by Lopez at al (A. Blanco, C. López, R. Mayoral, H. Míguez, F. Meseguer, A. Mifsud, and J. Herrero, *Appl. Phys. Lett. Lett.* 1998 73, 1781.)

Figure 6C:
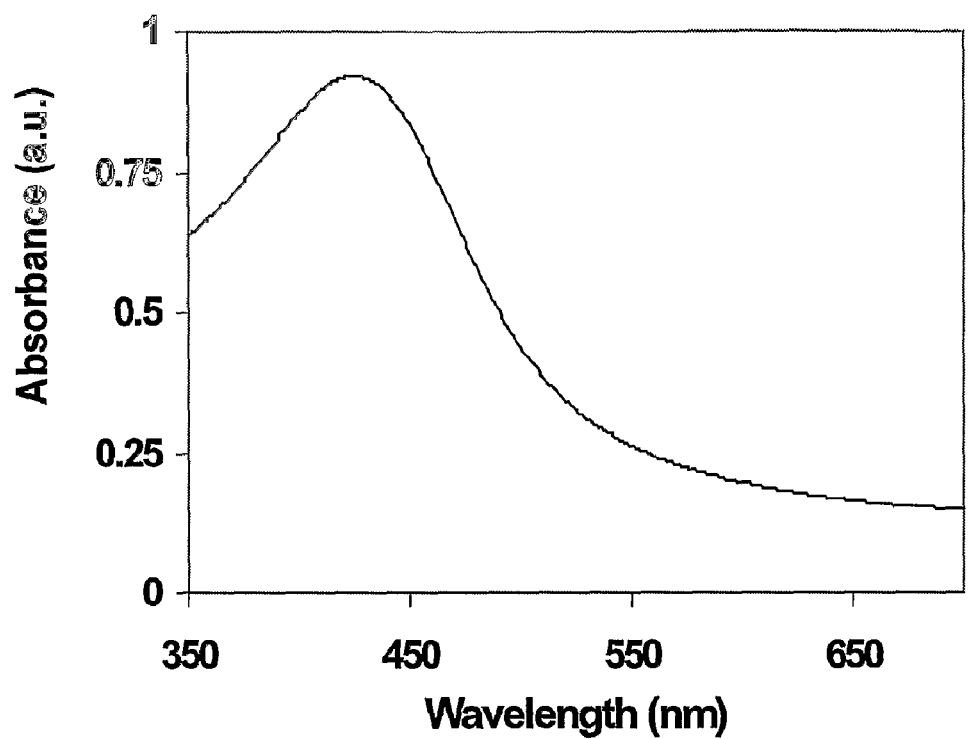
FIG. 6c shows UV-Visible absorbance of Ag nanoparticles synthesized on the surface of PMMA-PMAA microspheres. PMMA/PAA weight ratio is 0.44.

FIG. 6c shows the UV-visible spectrum of Ag nanoparticles. The existence of a single absorption peak at 430 nm was close to the value measured by Wang, W. and Asher, S. A. *J. Am. Chem. Soc.* 2001, 123, 12528 and Dai and J.; Bruening, M. L. *Nano Lett.* 2002, 2, 497 for 2.5 nm of Ag quantum dots.

FIGS. 6d and 6e show UV-Vis spectra (d) and photoluminescence spectra (e) of CdS nanoparticles synthesized in POLY(NIPAM-AA-HEA) microgels, respectively, before and after heat processing. In FIG. 6e Increasing loading of microgels with nanoparticles led to red-shift of absorption onset from 430 to 500 nm, indicating increase in NP size. Nevertheless, in all samples the onset of absorption was below 510 nm (measured for bulk CdS), suggesting the quantum confinement effect. Based on the NP size-absorption relation (Moffitt, M. L.; McMahon, P. V.; Eisenberg, A. *Chem. Mater.* 1995, 7, 1185-1192; Moffitt, M.; Vali, H.; Eisenberg, A. *Chem. Mater.* 1998, 10, 1021-1028; Zhao, H.; Douglas, E. P. *Chem. Mater.* 2002, 14, 1418-1423) the size of CdS nanoparticles varied from 3.0 to 5.9 nm, similar to the results of TEM image analysis. The dispersions of hybrid microgels were refluxed at for 12 h to refine the NP crystalline structure and improve their size distribution. The corresponding absorption spectra (dotted lines) show a sharper onset of absorption and appearance of absorption peaks, indicating enhanced NP size distribution due to Ostwald ripening of smaller nanoparticles. We note that this effect was more marked for NPs embedded in a lower amount in hybrid microgels.

FIG. 6e shows photoluminescence (PL) spectra of CdS NPs in the interior of microgels. The PL emission bands (bottom to top, solid lines) red-shifted and their intensity increased with increase in NP concentration in microgels. For higher NP concentration the PL spectra featured two well-resolved peaks. The shorter wavelength emission bands were ascribed to band gap PL of CdS NPs, since they coincided with absorption onset of these samples (FIG. 6e). The longer wavelength PL emission peaks resulted from the interstitial sulfur or cadmium vacancies. The relative intensity of these two peaks changed with increase in NP concentration and size. The width of PL bands of ca. 100-160 nm was similar or only slightly broader than that measured for the CdS NPs synthesized using starburst dendrimerslinear and brunched polymer stabilizers, and block copolymer micelles. The PL emission bands of CdS NPs showed a notable red-shift after heat treatment of hybrid microgels (FIG. 6e, dotted spectra). For microgels with a low concentration of NPs the PL peak shifted from 485 to 566 nm and the color of microgel changed from blue to yellow. The PL emission bands of hybrid microgels with a higher concentration of CdS NPs after heat processing featured a single broad PL peak. Since post heat processing of hybrid microgels improved NP size distribution (FIG. 6e), we ascribe these emission bands to the recombination of electrons trapped in a sulfur vacancy with a hole in the valence band of CdS. The color of these microgels after refluxing turned from green to orange or red. Thus by changing NP concentration in microgels and by using post heat treatment we obtained hybrid microgels with PL emission tunable in the entire visible spectral range.

Figure 6F:
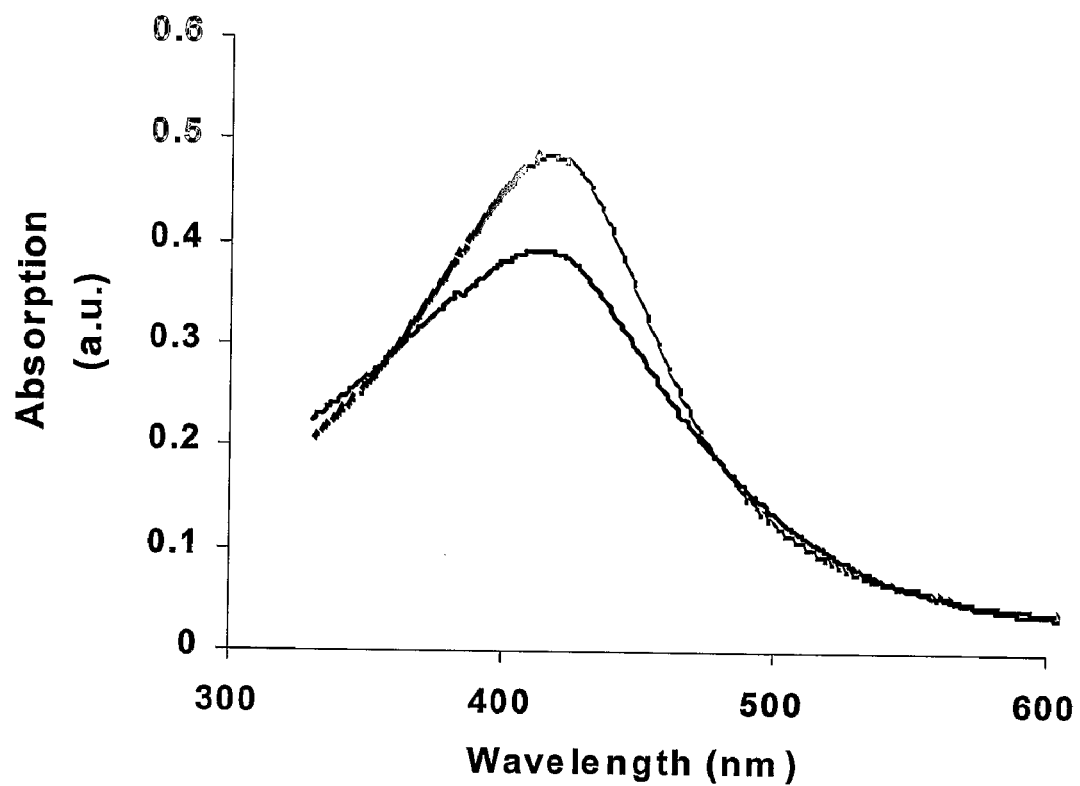
FIG. 6f shows the UV-Visible absorbance spectra of Ag nanoparticels synthesized in poly(NIPAM/AA/HEA) microgels Ag NP concentration in microgel: 0.23 g/g polymer (bottom spectrum), 0.39 g/g polymer (top spectrum). Microgel composition as in FIG. 6d, e.

FIG. 6f shows UV-Visible absorbance shows UV-Visible absorbance spectra of Ag NPs synthesized in the interior of in poly(NIPAM-AA-HEA) microgels. A well-defined surface plasmon resonance was measured at 411 nm (bottom spectrum), similar to that measured for ca. 2.5 nm-size Ag NPs by Asher at (Wang, W. and Asher, S. A. *J. Am. Chem. Soc.* 2001, 123, 12528). In microspheres with a lower concentration of Ag NPs (or smaller NP size) absorption peak broadened due to the "intrinsic size effect" in metal NPs (Mulvaney, P. *Langmuir.* 1996, 12, 788-800).

Figure 7A:
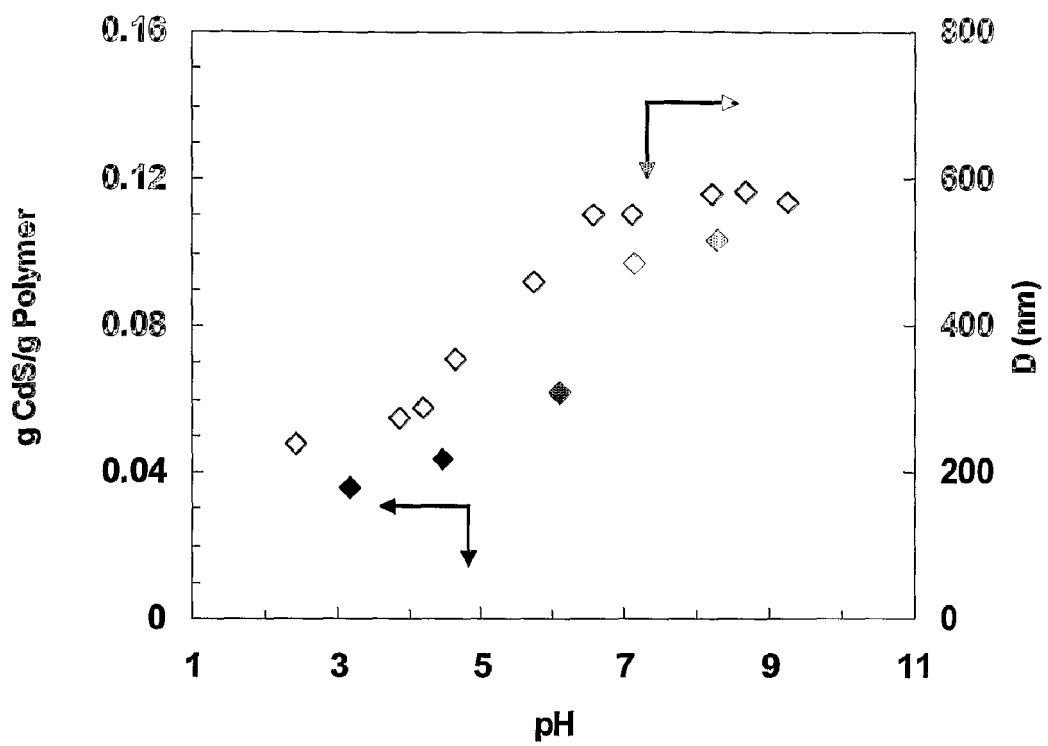
FIG. 7a shows the variation in diameter of poly (NIPAM-AA-HEA) microgel particles (◇) and in the concentration of CdS NPs in microgel (◆) plotted versus variation in pH, the molar ratio [AA]/[HEA]/[NIPAM] is 0.36/0.13/1; [COOH]/[Cd$^{2+}$]/[S$^{2-}$]=1/0.5/0.5; [BIS]=4 mol %.

FIG. 7a shows that increase in pH in the first step of nanoparticle synthesis led to a gradual increase in concentration of CdS NPs in the microgel. Stronger ionization of carboxyl groups of polyacrylic acid increased the driving force for the incorporation of cations into the microspheres. In addition, microgel size (and hence microgel voids) increased with pH: in the range 2.3<pH<9.2 the hydrodynamic radius of microgel particles increased from ca. 230 to 600 nm. For polyacrylic acid $pK_a$=4.75 (*Encyclopedia Polym. Sci. Eng.*, 2-nd edn., Ed. J. I. Kroschwitz, John Wiley and Sons, 1985; p. 212) thus the carboxyl groups were completely ionized at pH $\geq$6.

Further increase in microgel size for 6.0<pH<9.2 occurred due to the change in conformation of polyacrylic acid fragments from a highly compact structure to an expanded coil conformation. The range 6<pH<9 was not, however, realized in the NP synthesis due to the formation of insoluble metal hydroxides at elevated pH. The threshold values of pH in synthesis of CdS, Ag and $Fe_3O_4$ NPs were bound by the values of solubility products (*Lang's Handbook of Chemistry*, 15th ed., Section 8, Dean, J. A., Ed., McGraw Hill: New York, 1999): $K_{sp,Cd(OH)_2}$=7.2×10$^{-15}$, $K_{sp,AgOH}$=2.0×10$^{-8}$, and $K_{sp,Fe(OH)_2}$=4.87×10$^{-17}$, respectively. For example, the upper values of pH were 8.35 for [$Cd^{2+}$]=1.5 mM, 8.8 for [$Ag^+$]=3 mM and 7.1 for [$Fe^{2+}$]=1.5 mM.

The concentration of CdS NPs in the microgels was further controlled by changing the concentration PAA, PHEA and BIS in microgels (FIG. 7b-d) The variation in microgel size is given in the same figure. With increasing the amount of PAA and BIS in microgels the variation in concentration of CdS nanoparticles followed the trend in change of microgel size. In addition, increase in amount of PAA in microgels increased the affinity of $Cd^{2+}$-ions to microgels, which in turn, resulted in increase of CdS concentration. In contrast, increase in PHEA fraction resulted in decreased loading of microgels with CdS NPs (despite increasing microsphere size) because of the hydrophobic nature of PHEA and a reduced amount of AA fraction.

The concentration of CdS NPs in the microgels was further controlled by changing the molar ratio [$Cd^{2+}$]/[COOH] (FIG. 7e). The doping level of NPs was however lower than the value estimated from the stoichiometric ratio ([COOH]/[$Cd^{2+}$]=1/0.5: generally, only 77.5±12.5% of carboxyl groups reacted with $Cd^{2+}$-cations, even when the latter were added in excess. Therefore, following the introduction of metal ions in the microgel, the dispersion was dialyzed to remove free metal ions.

FIG. 7f shows the variation in the concentration of CdS NPs in microgels versus the molar ratio [$S^{2-}$]/[$Cd^{2+}$]. For [$S^{2-}$]/[$Cd^{2+}$]$\leq$1, microgel doping level linearly increased with [$S^{2-}$]/[$Cd^{2+}$]; whereas for [$S^{2-}$]/[$Cd^{2+}$]>1, no notable change in CdS loading was observed, suggesting that $S^{2-}$-anions added in excess did not take part in the formation of CdS NPs.

Figure 8:
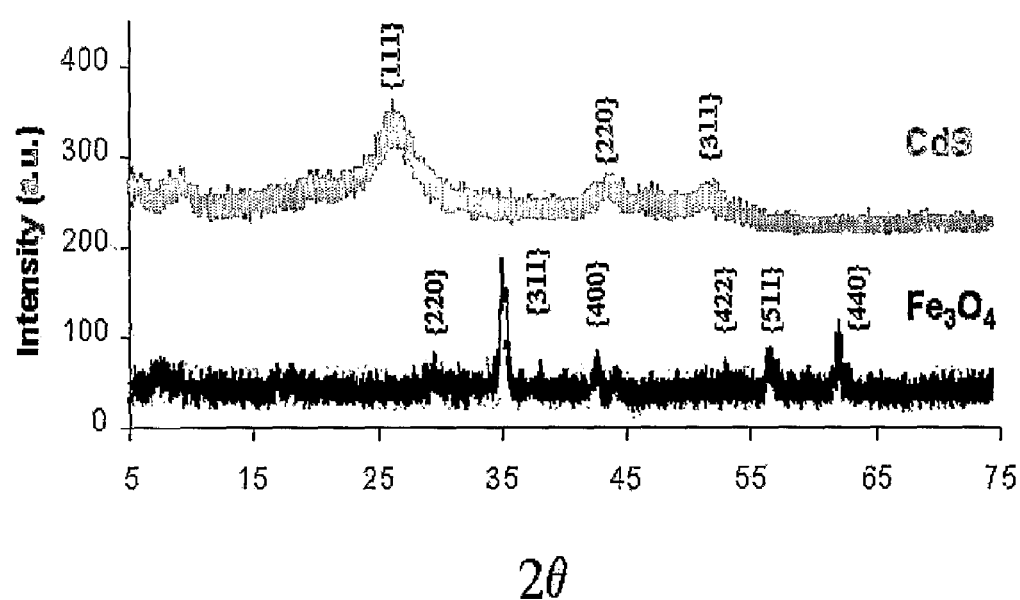
FIG. 8 shows an X-ray powder diffraction patterns of microgels doped with CdS (top) and Fe$_3$O$_4$ NPs. Microgel compositions: [AA]/[HEA]/[NIPAM]=0.36/0.13/1, [BIS]=4 mol %; [COOH]/[Cd$^{2+}$]/[S$^{2-}$]=1/0.5/0.5. CdS concentration in microgel is 0.027 g/g polymer; Fe$_3$O$_4$ concentration in microgel is 0.724 g/g polymer.

The structure of CdS— and $Fe_3O_4$ NPs synthesized in the interior of microgels was characterized using X-ray powder diffraction (XRD). In FIG. 8 the top XRD pattern of the CdS NPs exhibits characteristic peaks at scattering angles (2θ) of 26.4°, 43.9° and 51.9°, corresponding to scattering from the {111}, {220} and {311} planes, respectively, of a cubic CdS crystal lattice (the standard card JCPDS file #10-0454). Weak broadening of the diffraction peaks occurred due to the small NP size. The average nanocrystal size calculated using Scherrer equation[i] was 3.1 nm, consistent with the results obtained for the same sample from TEM image analysis. The bottom pattern in FIG. 6 shows XRD results for $Fe_3O_4$ NPs. The XRD patterns of magnetite ($Fe_3O_4$, JCPDS file #88-0315) and maghemite ($\gamma$-$Fe_2O_3$, JCPDS file #39-1346) are similar: they can be identified by comparing peak intensities. The data suggested that the nanocrystals synthesized in microgel templates were $Fe_3O_4$ NPs. We assigned the measured peak positions at their relative intensities (30.07° (28), 35.44° (100), 43.06° (20), 56.93° (25) and 62.64° (34)) to the {220}, {311}, {400}, {511} and {440} planes of $Fe_3O_4$ lattice, respectively. The mean crystallite size was 8.1 nm, (*X-ray Diffraction Procedures*, Klug, H. P.; Alexander L. E.; John Wiley: New York, 1959) in agreement with TEM image analysis.

Figure 9A:
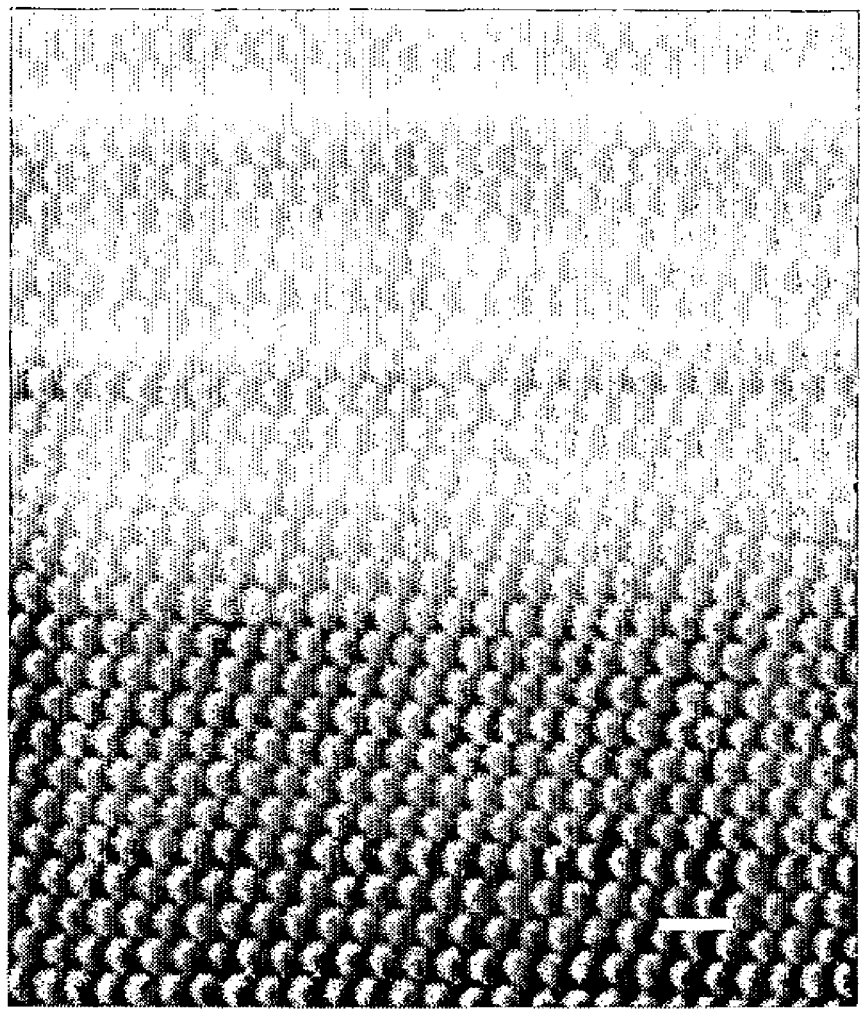
FIG. 9a is an SEM micrograph of colloid crystals obtained from 285 nm-size PMMA/PMAA latex particles coated with in-situ synthesized CdS nanoparticles. 2.5 μm
Figure 9B:
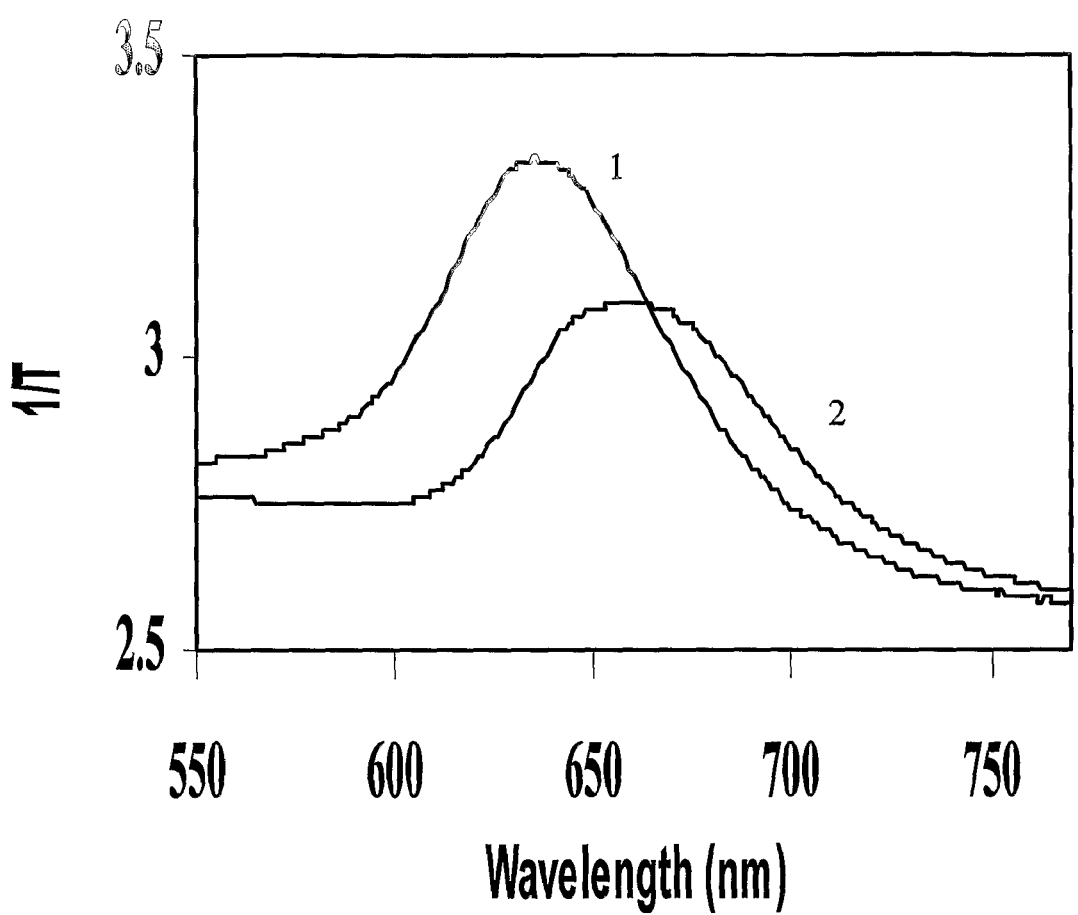
FIG. 9b shows the reciprocal of optical transmission of colloid crystal fabricated from bare (curve 1) and CdS-doped (curve 2) PMMA/PMAA latex microspheres (shown in FIG. 9a).

High monodispersity and negative surface charge of the latex particles coated with CdS nanoparticles were beneficial for colloid crystallization. SEM imaging showed that the core-shell microbeads doped with CdS or Ag nanoparticles formed multilayer colloid crystals. FIG. 9a shows a fragment of the colloid crystal obtained from 285-nm size core-shell particles containing 305 nm-size poly(NIPAM-AA-HEA) coated with CdS nanoparticles, while FIG. 9b shows the optical transmission spectrum measured for these crystals at normal incidence (θ=0°) to the (111) plane of the colloid crystals fabricated from the uncoated (curve 1) and CdS-doped particles (curve 2), respectively. For the array of 285 nm PMMA/PMAA microspheres a diffraction peak appeared at 631 nm, whereas when the same spheres were doped with CdS NPs the peak shifted to 656 nm. For such crystals the relation between the spectral position of the diffraction peak, $\lambda_c$, and the effective refractive index, $n_{eff}$, is $\lambda X_c$=1.632 $n_{eff}$D where D is the diameter of a microsphere. Since the colloid crystals obtained from the modified and uncoated microbeads had a similar lattice constant, we estimated a 4% increase in effective refractive index, in comparison with the array formed by unmodified PMMA/PMAA beads. The effective refractive indices of the bare and CdS-coated particles were 1.357 and 1.410, respectively. Furthermore, the amount of CdS NPs in the latex microspheres was calculated from the value of $n_{eff}$ of the CdS-doped colloid crystal assuming volume fraction of PMMA-PMAA beads to be 74% and using the relationship $n_{eff}^2$=0.26$n_a^2$+$n_{PMMA/PMAA}^2$(0.74−f)+$n_{NP}^2$f where $n_a$, $n_{PMMA/PMAA}$, and $n_{NP}$ are the refractive indices of air, PMMA/PMAA, and CdS, respectively, and f is the volume fraction of CdS in the colloid crystal. For $n_{PMMA/PMAA}$=1.491 and $n_{NP}$=2.5, f was found to be 0.021 and CdS/polymer volume ratio in the microspheres was 2.9 vol %.

Figure 1:
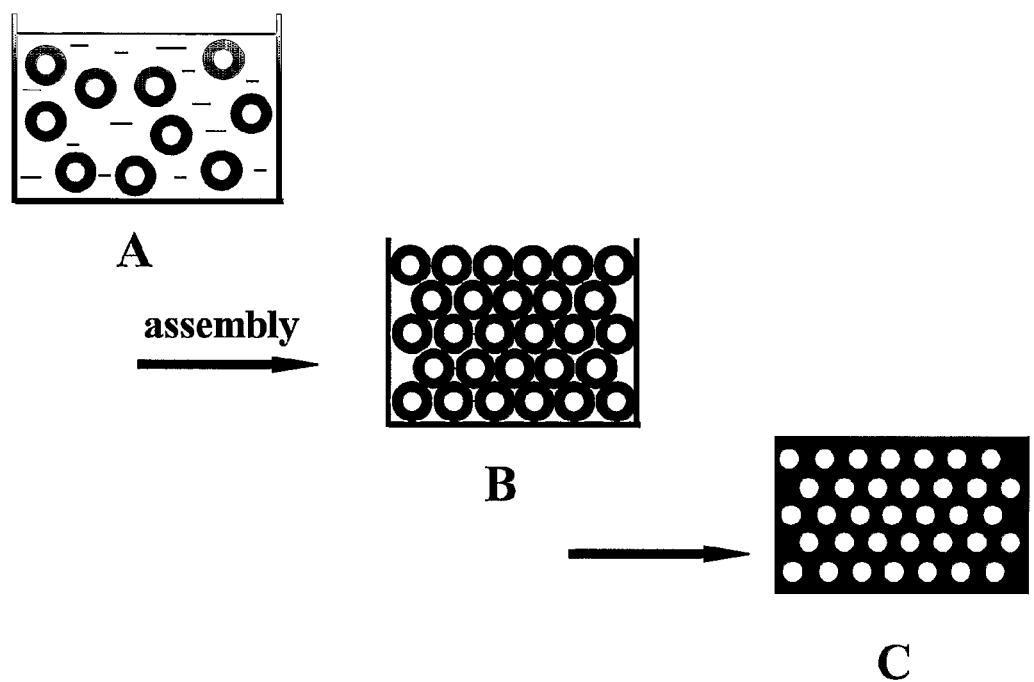
FIG. 1 shows a diagrammatic representation of a Prior Art "core-shell" approach to producing polymer-based nanostructured materials. A: synthesis of core-shell particles; B: assembly of core-shell particles in periodic arrays; C: heat processing of core-shell particles at $T_{g,SFP}<T_{ann}<T_{g,CFP}$ to produce nanocomposite material.
Figure 2:
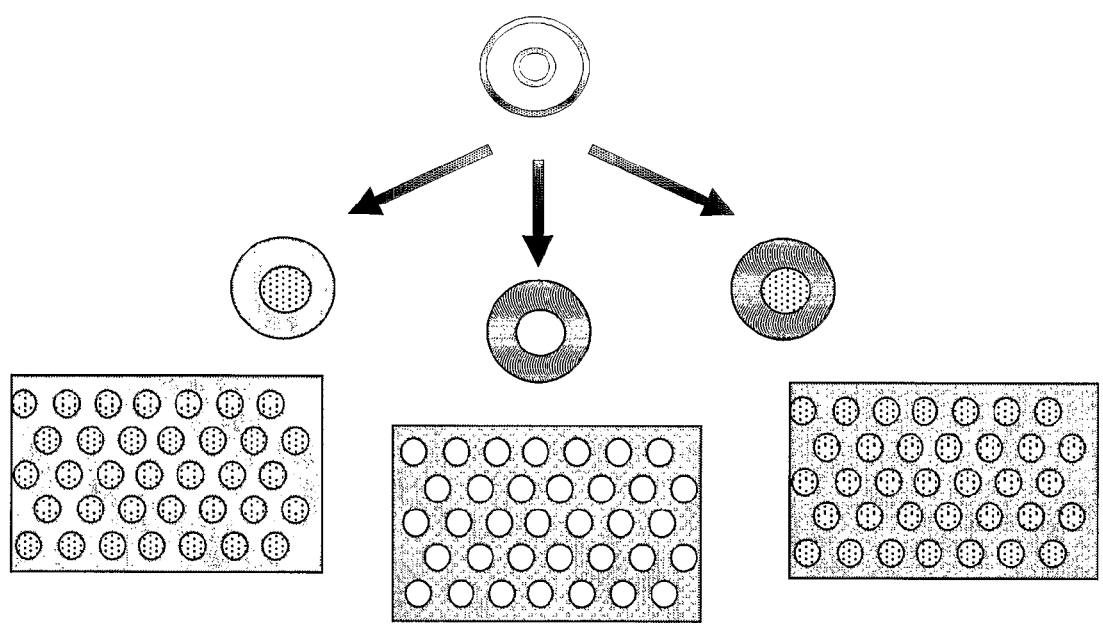
FIG. 2 is a diagrammatic representation showing possible localization of nanoparticles in core-shell latex microparticles in accordance with the present invention: (a) inside the latex core; (b) in the shell, and (c) in the core and in the shell.

In order to act as the functional building blocks in the "core-shell" approach (FIG. 1), hybrid nanoparticles-doped polymer microspheres had to be encapsulated with a shell-forming polymer. For the doped microgel spheres this step was also important in suppressing their hydrophilic nature, a serious obstacle in potential applications of these particles.

Relatively hydrophobic PMMA-PMAA and PS-PAA microspheres doped with CdS and Ag nanoparticles acted as seeds in emulsion polymerization. The presence of the inorganic nanoparticles on the surface of hybrid cores did not notably suppress interfacial polymerization. For the PMMA-PMAA hybrid cores the SFP was synthesized from a poly (methyl methacrylate)-poly(butyl methacrylate) (PMMA-PBMA) copolymer. The presence of PMMA in the latex shell resulted in the increase in compatibility between the PMMA core and the SFP. Hybrid PS-PM cores were encapsulated with PS-PMMA-PMAA-PBA copolymer. While PS and PAA enhanced the compatibility between the CFP and the SFP, PMMA provided good mechanical properties and PBA lowered the glass transition temperature of the SFP. To obtain a void-free polymer film by heat processing of the core-shell particles, the shell thickness was at least 20% of the radius of core particles.

Figure 10:
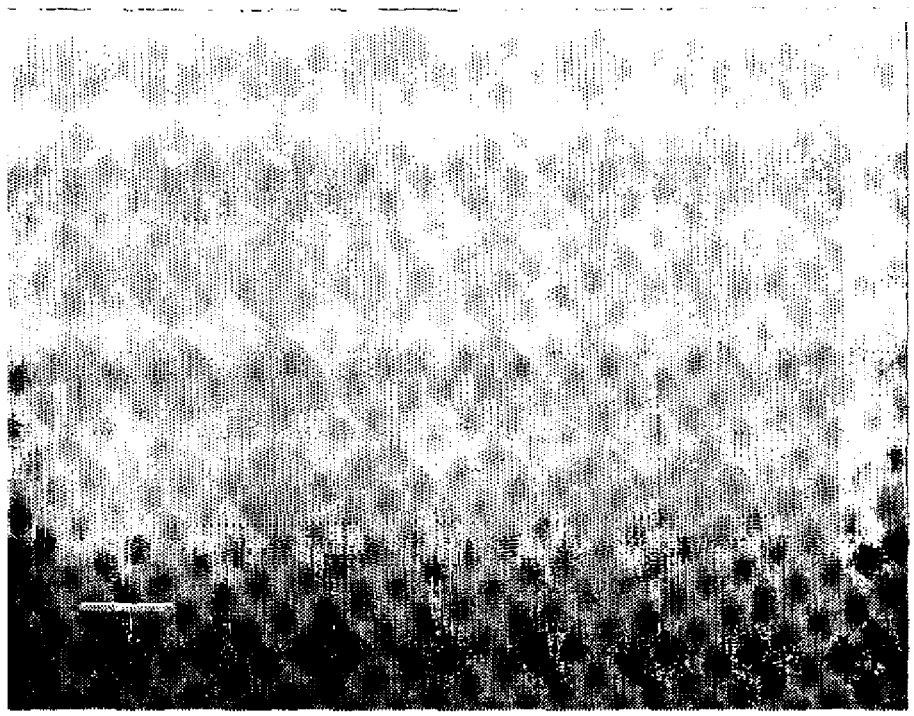
FIG. 10 shows a laser confocal fluorescent microscopy (LCFM) image of hybrid CdS-polymer nanocomposite obtained from CdS-doped PMMA-PMMA-PBMA core-shell particles with the image taken 10 μm below the surface of the film. CdS was excited by UV light at λ=364 nm; Scale bar is 2 μm.

FIG. 10 shows a typical morphology of the film obtained from the particles containing CdS-coated PMMA cores. First, to the best of the resolution of laser confocal fluorescent microscopy (LCFM) no distortion in the structure (z vs x-y planes) was observed during annealing. Second, we did not observe any cracking or distortion of the periodic structure of the array due to at least 26% shrinkage during annealing. Third, the morphology of the film appeared as an inverse of the structure anticipated in the final stage in Scheme (a) in FIG. 3a: the dark domains corresponded to the non-fluorescent cross-sections of the PMMA-PMAA latex cores, whereas the bright background corresponded to the PMMA-PBMA matrix doped with fluorescent CdS nanoparticles. The latter feature could indicate that the NPs detached from the surface of the latex cores and uniformly mixed with the SFP during polymerization of film formation.

The need in encapsulation was more rigorous for hybrid microgel particles because of their hydrophilic nature. FIG. 11a shows the thermal response of poly(NIPAM-M-HEA) microspheres doped with CdS nanoparticles. Hybrid microgels featured the same variation in D vs T as the corresponding host microgel particles. The decrease in diameter of the hybrid microgel particles reached up to ca. 55% at 75° C., which corresponded to ca. 90% reduction in particle volume in the deswollen state. A similar size dependence of temperature was observed for the microgel particles carrying Ag nanoparticles.

Poly(NIPAM-AA-HEA) microspheres doped with CdS and Ag NPs were encapsulated with hydrophobic shells by copolymerizing methyl methacrylate (MMA), butyl acrylate (BA) and acrylic acid (M) in weight ratio 15/4/1 on the surface of the hybrid microgel particles. Interfacial polymerization of poly(MMA-BA-AA) shells was carried out at 75° C. and pH=4.2. Under these conditions, poly(NIPAM-AA-HEA) microspheres dramatically shrank and water was expelled from the hydrogel core. Thus polymerization of poly(MMA-BA-AA) inside the particle core was substantially hindered, and the core-shell structure of the poly(NIPAM-AA-HEA)/poly(MMA-BA-AA) microbeads could be anticipated. The diameter of the core-shell particles varied from 370 to 560 nm, thus for the corresponding poly(NIPAM-AA-HEA) cores at 75° C. the thickness of the poly(MMA-BA-AA) shells varied from 95 to 120 nm. Following microgel encapsulation, a yellow dispersion of CdS/poly(NIPAM-AA-HEA) particles or dark-brown dispersion of Ag/poly(NIPAM-AA-HEA) turned into a stable turbid white latex. Polydispersity of the core-shell particles did not exceed 0.07; thus the nucleation and growth of the secondary poly(MMA-BA-AA) particles were negligible. The electrokinetic potential of the hybrid core-shell microspheres was ca. −55 mV.

FIG. 11b shows the variation in dimensions of CdS core-shell microspheres with the change in temperature. By contrast with microgel microspheres, for the entire temperature range (up to 75° C.), regardless of the core composition, no notable change in dimensions of the core-shell particles was observed for the time periods exceeding 30 min. A similar trend was observed by Lyon et al (J. Wang, D. Gan, L. A. Lyon, M. A. El-Sayed, *J. Am. Chem. Soc.* 2001, 123, 11284) for the microgel particles with poly(NIPAM) cores and poly(NIPAM-butyl methacrylate) shells: addition of the small amount of hydrophobic poly(butyl methacrylate) into the microgel dramatically decreased the rate of thermoinduced particle collapse. In the present work, the absence of thermal response of the hybrid core-shell particles indicated that (a) poly(MMA-BA-AA) shells had a dense structure and (b) hydrophilic poly(NIPAM-AA-HEA) cores were screened from the aqueous medium. A similar screening effect of the shell was observed for the core-shell particles doped with Ag nanoparticles.

Figure 11C:
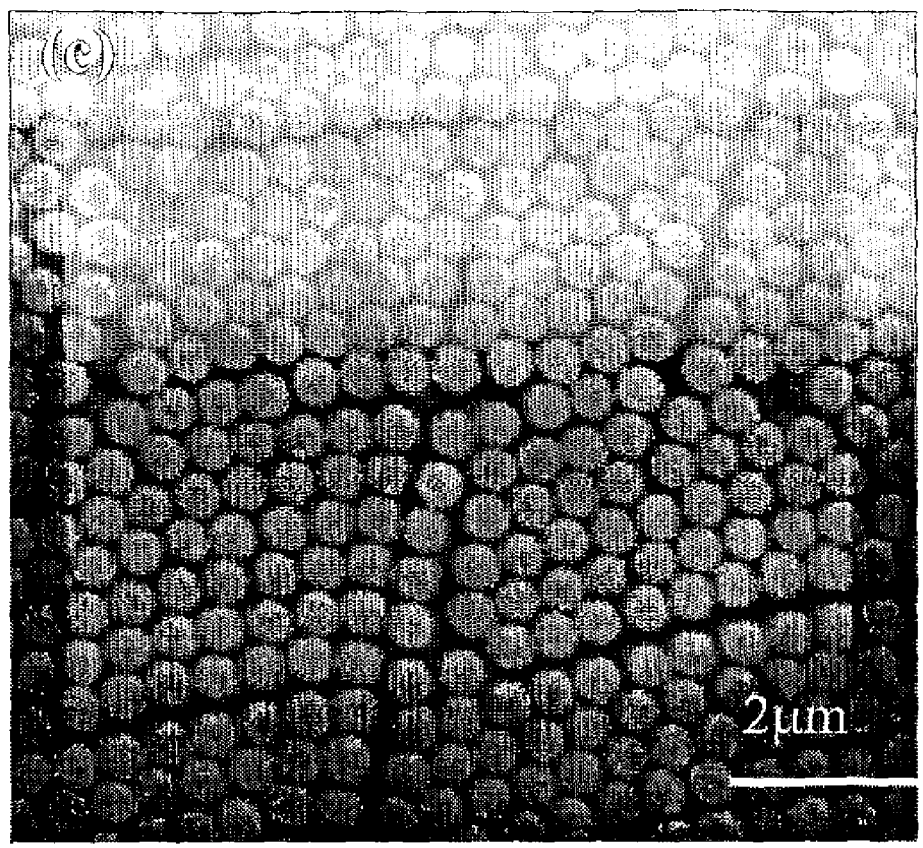
FIG. 11c is an SEM micrograph of colloid crystals obtained from 580 nm-size core-shell particles with 305 nm-size poly(NIPAM-AA-HEA) cores doped with CdS NPs (φ=0.44)
Figure 11D:
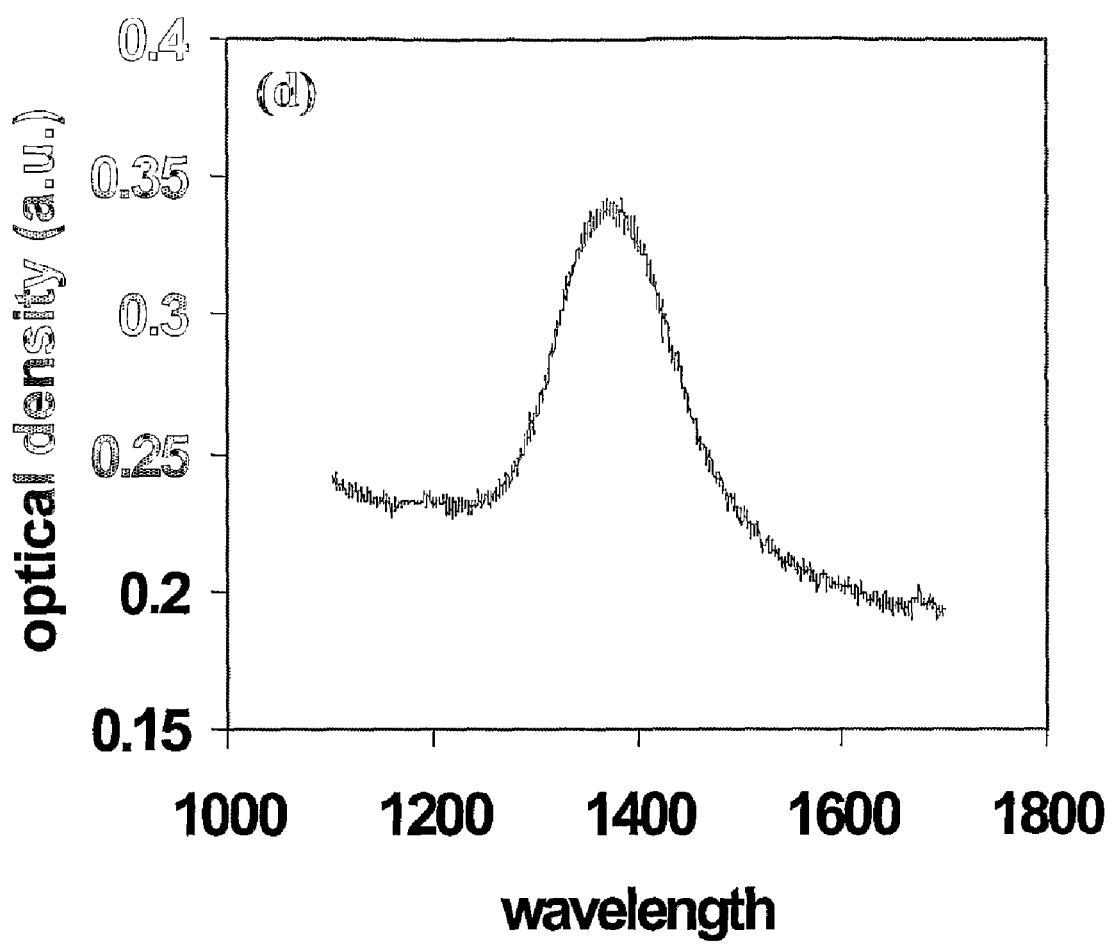

The core-shell particles obtained after encapsulation were used as the building blocks for photonic crystals. FIG. 11c shows an SEM image of the fragment of the colloid crystal obtained from 580-nm size core-shell particles containing 305 nm-size poly(NIPAM-AA-HEA) cores doped with CdS NPs. FIG. 11d shows the transmission spectrum for this colloid crystal. The spectrum shows a peak arising from Bragg diffraction from (111) planes of the crystal. The position of the peak at $\lambda_c$=1354 nm was used for the estimation of the concentration of CdS nanoparticles in the core shell-particles. The data were fit to the Bragg law: $\lambda_c=1.632d\,(n_{eff}^{(2)}-\sin^2\theta)^{1/2}$, Miguez, C. López, F. Meseguer, A. Blanco, L. Vazquez, R. Mayoral, M. Ocana, V. Fornes, A. Mifsud, Appl. Ohys. Lett. 1997, 71, 1148) where $n_{eff}$ is the effective refractive index of the crystal and d is the diameter of the core-shell sphere. The value of $n_{eff}$ obtained from data fit was 1.43. It was assumed that the volume fraction of the hybrid polymer spheres in the colloid crystal is 0.74 and used the relation $n_{eff}^2=0.26\,n_{air}^2+(0.74-f)\,n_{pol}^2+fn_{CdS}^2$ (H. Miguez, C. López, F. Meseguer, A. Blanco, L. Vazquez, R. Mayoral, M. Ocana, V. Fornes, A. Mifsud, Appl. Phys. Lett. 1997, 71, 1148) where $n_{pol}$ is the average refractive index of the copolymer in the core-shell particles, f is the volume fraction of CdS particles in the colloid crystal, and $n_{CdS}$ is the refractive index of CdS. For $n_{pol}$=1.50 (J. Brandrup, E. H. Immergut, i Polymer Handbook, 3rd Ed. John Wiley & Sons, New York, 1989) and $n_{CdS}$=2.5, (R. H. Perry, D. W. Green, J. O. Maloney, *Perry's Chemical Engineers' Handbook,* 7 th Ed. McGraw-Hill, New York, 1997 f was found to be 0.03 and volume fraction of CdS in the polymer microspheres was 0.041.

Figure 12:
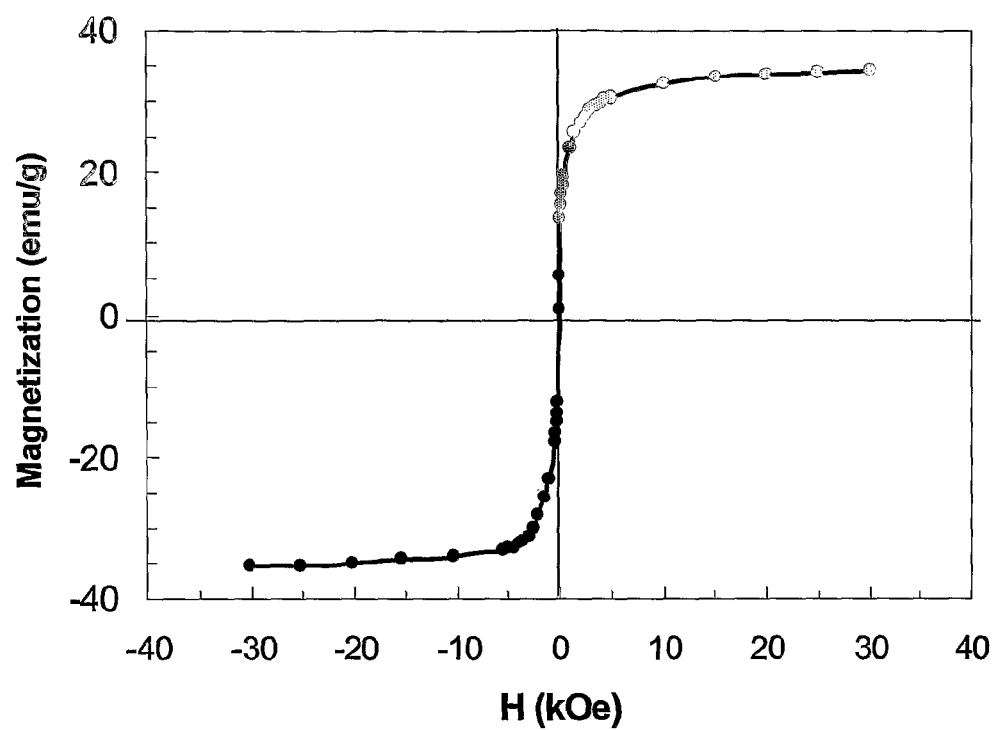
FIG. 12 shows the magnetic properties of $Fe_3O_4$ NPs in the interior of dried poly(NIPAM-AA-HEA) microgel, the NP concentration is 0.724 g/g polymer, T=300 K, and the microgel composition [NIPAM]=0.36/0.13/1, [BIS]=4 mol %; [COOH]/[$Cd^{2+}$]/[$S^{2-}$]=1/0.5/0.5.

FIG. 12 demonstrates magnetic properties of $Fe_3O_4$ NPs synthesized in the interior of 500 nm-size microgels. No hysteresis was observed, that is, both remenance and coercivity were zero, consistent with superparagmagnetic properties of magnetite NPs with diameter below 12 nm (*Nanomagnetism*; Hernando, A., Ed.; Kluwer Academic Publishers: Dordrecht, The Netherlands, 1993; Easom, K. A.; Klabunde, K J.; Sorenson, C. M.; Hadjipanayis, G. C. *Polyhedron* 1994, 13, 1197-1223). At 10 kG, the composite particles had magnetic saturation moment of Ms=32.4 emu/g, corresponding to magnetic susceptibility of $\chi$=3.24×10$^{-3}$ emu/(g Oe) or $\chi$=0.07 (calculated from the density of bulk magnetite of 5.18 g/cm$^3$) ((*Nanomagnetism*; Hernando, A., Ed.; Kluwer Academic Publishers: Dordrecht, The Netherlands, 1993; Easom, K. A.; Klabunde, K J.; Sorenson, C. M.; Hadjipanayis, G. C. *Polyhedron* 1994, 13, 1197-1223). Using Ms=92 emu/g of the bulk magnetite, we estimated magnetic saturation moment to be Ms=38.6 emu/g ((*Nanomagnetism*; Hernando, A., Ed.; Kluwer Academic Publishers: Dordrecht, The Netherlands, 1993; Easom, K. A.; Klabunde, K J.; Sorenson, C. M.; Hadjipanayis, G. C. *Polyhedron* 1994, 13, 1197-1223), higher than the experimental value Ms=32.4 emu/g. The decrease in Ms was due to the small NP size (Ziolo, R. F.; Giannelis, E. P.; Weinstein, B. A.; O'Horo, M.; Ganguly, B. N.; Mehrotra, V.; Russell, M. W.; Huffman, D. R. *Science* 1992, 257, 219;

Easom, K. A.; Klabunde, K J.; Sorenson, C. M.; Hadjipanayis, G. C. *Polyhedron* 1994, 13, 1197).

The strategy described herein has several distinct features that are particularly attractive for fabrication of composite materials with advanced properties. First, in-situ synthesis of the nanoparticles allows for spatial localization of their nucleation and growth sites thus controlling their size. This feature demonstrated for synthesis of nanoparticles in POLY (NIPAM-AA-HEA) microgels is intrinsic for synthesis in confined geometries. Moreover, as has been shown by Antonletti, M.; Grohn, F.; Hartmann, J.; Bronstein, L. (*Angew. Chem. Int. Engl. Ed.* 1997, 36, 2080) synthesis of inorganic nanoparticles in microgels can produce nanoparticles with peculiar geometries, although these nanoparticles have a larger size than it was achieved in our work. Therefore, synthesis of nanoparticles in microgels can be used in it's own right for producing inorganic nanocrystals in a particular size range. Second, the incorporation of nanoparticles in the microspheres opens a new avenue for producing hybrid multiscale composite materials with periodic structures. A periodic organization of submicrometer core-shell particles leads to a mesoscopic periodicity in the ultimate material, whereas the diameter of nanoparticles on the order of several nanometers determines their confined electronic states and consequently, the spectral properties of their interactions with light via the quantum size effect.

Recently, hybrid microspheres have been intensively studied, the in-situ syntheses of the nanoparticles on the surface of latex microbeads or in the bulk of microgels have advantages over the incorporation of pre-formed nanoparticles: high surface charge, monodipersity of the polymer microbeads and nanoparticles, and good stability of colloid dispersions. These features are critical for colloid crystal growth. (H. Miguez, F. Meseguer, C. Lopez, A. Blanco, J. S. Maya, J. Requena, A. Mifsud, V. Fornÿs, *Adv. Mater.* 1998, 10, 480; P. Jiang, J. F. Bertone, K. S. Hwang, V. L. Colvin, Chem. Mater. 1999, 11, 2132; Yin, Y.; Lu, Y.; Gates, B.; Xia, Y. J. Am. Chem. Soc. 2001, 123, 8718; Vickreva, O.; Kalinina, O.; Kumacheva, E. 2000, 12, 110; Kumacheva, E.; Golding, R. K. Allard, M.; Sargent, E. H. Adv. Mater. 2002, 14, 221).

The variation in nanoparticle dimensions allows varying the spectral position of absorption peak, which would, it turn, change the nonlinear properties of the material. Moreover, hybriod microspheres can be organized in a colloid crystals, in the ultimate material the nanoparticles are spatially localized in the periodic array and the material enables tunable nonlinear diffraction.

The ability to synthesize very small $Fe_3O_4$ nanoparticles is what results in their exhibiting superparamagnetic properties, which can be used for biochemical and chemical separation or drug delivery.

Using the method disclosed herein, nanocomposite materials with periodically modulated magnetic and electric properties can be produced by incorporating metal nanoparticles in different compartments of multilayer polymer microbeads. Furthermore, nanostructured materials with several functions, can be fabricated by employing hybrid core-shell particles with multilayer structures and/or by doping the cores and the shells of the polymeric spheres with different nanoparticles.

Of key importance in the present invention in the case of both the polymer microparticles having the nanoparticles incorporated onto the outer surface of the microparticles and the polymer microgel particles is the ability to tune the material properties of the nanoparticles depending on how the particles are treated. The point of treating the particles is to produce ligands at the surface or in the interior of the microgel particles which in essence act as nucleation sites for growth of the nanoparticles. In the examples given above the $COO^-$ ligands act as the nucleation sites and the microparticles are treated to give a selected concentration of the $COO^-$ ligands so they are not too close to each other (thus causing formation of large particles or precipitation of large particles) and not too far apart to produce too few nucleation sites. As the results in the Examples show, this has an impact on the material properties of the nanoparticles including their size, morphology and crystallinity of the nanoparticles. These properties in turn determine the optical, electronic and magnetic properties of the microparticles which can then be tuned to give particular optical, electronic and magnetic properties depending on the end application for which the colloidal particles are being produced.

The ligands in the examples above were $COO^-$ produced by deprotonating COOH groups present in the polymer constituents making up the microparticles. In the examples above the COOH were produced by varying the ratio of the polymer constituents in the polymer microparticles to each other.

In the case of the polymer microgel particles an important feature is shrinkage of the doped microgel particles by expulsion of the liquid from the microgel particles in which the dispersion is formed, followed by encapsulation of the collapsed microgel particles with a rigid shell that suppresses stimuli response of the microgel particles. It will be understood that the present invention has been exemplified using two examples of polymer microgel particles, however, most polymer microparticles can be converted to a microgel particles if it is exposed to a suitable solvent that results in swelling of the polymer constituents thus permitting inflow of the ions or molecular complexes containing the metal species from which the nanoparticles are to be grown.

Prior to encapsulation of the doped polymer microgel particles they are treated under conditions that lead to their shrinkage and removal of water (of any other solvent of which the dispersion is comprised) from the interior of the particles thus condensing them. For this reason the polymer microgel particles are made from stimuli-responsive polymer constituents (i.e that respond to a change in temperature, pH or ionic strength of the liquid medium). The hydrophobic shell is used to suppress interactions between the doped core and the liquid medium (that is, suppress stimuli response of the doped cores. To make arrays of the particles a second polymeric shell is formed around each nanoparticle containing polymer microgel particles followed by annealing the encapsulated polymer microgel particles together to form the periodic array.

The present invention has been illustrated using examples in which metal ions are incorporated into an electrical double layer formed between the polymer microparticles and the liquid of the dispersion due to the negative charge on the $COO^-$ ligands, Specifically, use has been made of electrostatic attachment between anions $SO_4^{2-}$ and $COO^-$ and cations in the solution. However, it will be understood that one can use polymer constituents which include positively charged groups, e.g., imidosole, amino groups, or iminogroups on the polymer and provide electrostatic interactions with anions.

Further, it will be understood that the present invention is not restricted to electrostatic interactions for trapping the material forming the nanoparticles at the surface of the microparticles. For example, the dispersion of polymer microparticles may be treated in such a way as to modify the outer surface of the polymer microparticles to provide ligands on the outer surface of the polymer microparticles that can form a complex with atoms of a metal, ions of the metal, or molecular moieties containing the metal at the surface of the polymer microparticle. One then adds atoms of the metal, ions of the metal, or molecular moieties containing the metal to the dispersion of polymer microparticles under conditions suitable to facilitate formation of a complex between the ligands and the atoms of the metal, ions of the metal, or molecular moieties at the surface of the polymer microparticles. The ligand may be biological in nature which can coordinate with metals or it may be other organic based ligands other than $COO^-$. Specific non-limiting examples of this include the formation of complexes between Ni cations and imidozole groups present in one of the polymer constituents. Another example may be alginate polymer constituents in the microparticle will form complexes with $Fe^{3+}$.

The nanoparticles may be comprised of pure metals, compounds including semiconductors, dielectric materials, metal hydroxides or metal oxides to mention just a few. Nanoparticles of metals such as Ag, Au, Co, Ni, Fe have been successfully incorporated into the surface of the polymer microparticles and interior of the polymer microgel particles. However, the inventors contemplate that in principle most (if not all) metals can be used as long as the precursor cations are introduced in the electrolyte medium and specific interactions exit between atoms or ions of the metals and the functional groups or ligands formed on the surface of the polymer microparticles. The most useful metals contemplated by the inventor to be useful and which may be incorporated include Ag, Au, Co, Ni, Fe, Ag, Au, Co, Mn, Ni, Fe, Pt, Ta, W, Cu, Si, Mo, Zn, Cd, Nb, Y, Ge, Sn, Pb, Al, Ga, In and Ti.

The semiconductor example disclosed herein was CdS but other semiconductors have also been made including PbS, CdSe and CdTe. Nanoparticles comprising metal oxides such as FeO, $Fe_2O_3$, but it will be understood that oxide nanoparticles may be based on any metal fall within the scope of the present invention.

The agent which interacts with the atoms of a metal, ions of the metal, or molecular moieties containing the metal to form nanoparticles may in the case of metal ions be a chemical reducing agent such as the example given above for reducing silver ions to silver. In addition to a chemical reducing agent, light may be used to reduce the metal cations to produce the pure metal nanoparticles.

In summary, the present invention disclosed herein provides a new strategy for producing hybrid composite materials, which employs mesoscopic polymeric spheres doped with nanometer inorganic particles. The intrinsic features of our approach are (a) the in-situ synthesis of the NPs on the surface of latex microspheres or in the bulk of microgels and (b) a "core-shell" approach to producing periodically structures composite materials. The in-situ synthesis of the NPs in/on the microspheres provides good control over nanocrystal dimensions and their concentration in/on the microbeads. Following synthesis of the NPs, polymer beads can serve as seeds in interfacial polymerization of the shell-forming polymer. The described approach has potential application for producing photonic crystals since (i) polymer microbeads doped or coated with the NPs are monodisperse, stable, charged, and smooth; thus they retain their ability to assemble in two- or three-dimensional arrays; (ii) doping of polymer microbeads with metal and semiconductor nanoparticles greatly enhances the refractive index contrast between the particles and the surrounding medium, e.g., an undoped polymer, thus leading to enhancement of diffraction properties. ((a) Wang, T.; Cohen, R. E.; Rubner, M. F. *Adv. Mater.* 2002, 14, 1534, (b) Lu, Y.; Yin, Y; Li, Z.; Xia, Y. *Nano Lett.* 2002, 2, 785 (c) Lin, Y.; Zhang, J.; Sargent, E. H.; Kumacheva, E. Appl. Phys. Lett. 2002, 8, 3134).

Moreover, new properties of such materials can be obtained by combining their structurally and angularly dependent optical properties (arising from optical diffraction) and optical properties of the NPs (arising from the quantum size effect). The proposed approach shows a new avenue for producing optically responsive materials with periodicity commensurable with the wavelength of light, an intrinsic property of photonic crystals.

It will be understood that instead of embedding nanoparticles on the surface of the core particles, or in the interior of the polymer microgel particles, the nanoparticles may be grown in the shell forming polymer using the same method as growing them in the polymer microgel particles. Also, the nanoparticles could be grown in the interior of the core microgel particles and in the shell forming polymer.

As used herein, the terms "comprises", "comprising", "including" and "includes" are to be construed as being inclusive and open ended, and not exclusive. Specifically, when used in this specification including claims, the terms "comprises", "comprising", "including" and "includes" and variations thereof mean the specified features, steps or components are included. These terms are not to be interpreted to exclude the presence of other features, steps or components.

The foregoing description of the preferred embodiments of the invention has been presented to illustrate the principles of the invention and not to limit the invention to the particular embodiment illustrated. It is intended that the scope of the invention be defined by all of the embodiments encompassed within the following claims and their equivalents.

Therefore what is claimed is:

1. A process of synthesizing a composite colloidal polymer-inorganic material, comprising the steps of:
    a) synthesizing a dispersion of polymer microgel particles in a liquid;
    b) treating said dispersion of polymer microgel particles to modify an interior of the polymer microgel particles to provide an effective concentration of ligands in the interior of the polymer microgel particles, the ligands being selected to form a complex with atoms of a metal, ions of the metal, or molecular moieties containing the metal in the interior of the polymer microparticle;
    c) adding atoms of the metal, ions of the metal, or molecular moieties containing the metal to the dispersion of polymer microgel particles under conditions suitable to facilitate uptake of the atoms of the metal, ions of the metal, or molecular moieties into the interior of the polymer microgel particles;
    d) exposing the dispersion of polymer microgel particles to a first effective agent which interacts with the atoms of the metal, ions of the metal, or molecular moieties in the interior of the polymer microgel particles to form nanoparticles in the interior of the polymer microgel particles, the nanoparticles being comprised of at least the metal, the effective concentration of ligands being selected to give nanoparticles with specified material properties;
    e) exposing the polymer microgel particles to a second effective agent which results in the polymer microgel particles expelling the liquid therefrom which causes the polymer microgel particles to contract in volume; and
    f) encapsulating the contracted polymer microgel particles with the nanoparticles in the interior thereof in a protective polymeric shell material, the protective polymeric shell material being effective to suppress interactions between the contracted polymer microgel particles and the liquid.

2. The process according to claim 1 including encapsulating the polymer microgel particles with the nanoparticles contained therein in an outer polymeric shell, and annealing the encapsulated polymer microgel particles to form a periodic array of polymer microgel particles.

3. The process according to claim 1 wherein the specified material properties include size, morphology and crystallinity of the nanoparticles.

4. The process according to claim 1, wherein the step of treating said dispersion of polymer microgel particles to modify an interior of the polymer microgel particles provides electrically charged ligands which facilitate formation of an electrical double layer into which ions of opposite electrical charge are incorporated.

5. The process according to claim 4 wherein the electrically charged ligands are negatively charged, and wherein the ions of opposite electrical charge are cations of the metal.

6. The process according to claim 4 wherein the electrically charged ligands are positively charged, including adding a selected anion to the dispersion wherein the anions coordinate with the positively charged ligands to form a negatively charged ligand-anion complex, and wherein cations of the metal are incorporated into an electrical double layer produced by the negatively charged ligand-anion complex.

7. The process according to claim 5 wherein the cations of the metal are added to the dispersion in a salt of the metal, and wherein the first effective agent is a reducing agent, and wherein the nanoparticles comprise the selected metal by itself.

8. The process according to claim 5, wherein the first effective agent includes anions which react with the metal cations to form a compound, the nanoparticles being comprised of the compound.

9. The process according to claim 8 wherein the compound is one of a semiconductor, metal hydroxide and metal oxide.

10. The process according to claim 8 wherein the metal ion is $Cd^{+2}$, and the anion is $S^{-2}$, and wherein the compound is a semiconductor CdS.

11. The process according to claim 10 wherein the semiconductor is selected from the group consisting of CdS, PbS, CdSe and CdTe.

12. The process according to claim 7 wherein the metal is silver and the metal salt is a silver salt, and wherein the nanoparticles are silver nanoparticles.

13. The process according to claim 12 wherein the Ag nanoparticles exhibit fluorescence upon illumination with UV light.

14. The process according to claim 12 wherein the silver salt is $AgNO_3$ contained in an aqueous solution, and wherein the reducing agent is $NaBH_4$ contained in a solution mixed with the dispersion of core polymer micro particles.

15. The process according to claim 1, wherein the metal is selected from the group consisting of Ag, Au, Co, Ni, Fe, Ag, Au, Co, Mn, Ni, Fe, Pt, Ta, W, Cu, Si, Mo, Zn, Cd, Nb, Y, Ge, Sn, Pb, Al, Ga, In and Ti.

16. The process according to claim 9 wherein the wherein the cations of the metal are added to the dispersion in a salt of the metal, and wherein the effective agent includes oxide anions which react with the metal cations to form a metal oxide, the nanoparticles being comprised of the metal oxide.

17. The process according to claim 16 wherein the metal is selected from the group consisting of Ag, Au, Co, Ni, Fe, Ag, Au, Co, Mn, Ni, Fe, Pt, Ta, W, Cu, Si, Mo, Zn, Cd, Nb, Y, Ge, Sn, Pb, Al, Ga, In and Ti.

18. The process according to claim 1 wherein the step of synthesizing a dispersion of polymer microgel particles includes copolymerization of N-isopropyl acrylamide (NIPAM), acrylic acid (AA), and 2-hydroxyethyl acrylate (HEA) using precipitation polymerization, and wherein the polymer microgel particles contain carboxyl (COOH) groups, and wherein the step of treating the dispersion of polymer microgel particles in such as way as to ionize the functional groups in the interior of the polymer microgel particles includes deprotonation of the COOH groups to produce charged $COO^-$ groups in the interior of the polymer microgel particles.

19. The process according to claim 18 wherein the step of encapsulating the polymer hydrogel microparticles with the nanoparticles in the interior thereof in a polymeric shell includes encapsulating the PNIPAM-PAA-PEHA microgel particles with a hydrophobic poly(methyl methacrylate)-poly(butyl acrylate)-polyacrylic acid shell (weight ratio 15/4/1, respectively).

20. The process according to claim 1 wherein the dispersion is synthesized with the polymer microgel particles present in an amount of about 1 to about 10 wt % of polymer microgel particles.

21. The process according to claim 1 wherein the dispersion is synthesized with the polymer microgel particles present in an amount of about 1 to about 2 wt % of polymer microgel particles.

22. The process according to claim 1 wherein the step of synthesizing a dispersion of polymer microgel particles includes synthesizing crosslinked poly(styrene-acrylic acid) (PS-PAA) latex microparticles and transforming said crosslinked poly(styrene-acrylic acid) (PS-PAA) latex microparticles into microgel particles by exposure to an aqueous solution at sufficiently high pH.

23. The process according to claim 1 wherein the second effective agent includes change in temperature, change in pH or change in ionic strength of the liquid medium.

* * * * *